(12) United States Patent
Allegra et al.

(10) Patent No.: US 12,520,738 B2
(45) Date of Patent: Jan. 6, 2026

(54) PHASE-CHANGE MEMORY CELL WITH ASYMMETRIC STRUCTURE, A MEMORY DEVICE INCLUDING THE PHASE-CHANGE MEMORY CELL, AND A METHOD FOR MANUFACTURING THE PHASE-CHANGE MEMORY CELL

(71) Applicant: STMicroelectronics S.r.l., Agrate Brianza (IT)

(72) Inventors: Mario Allegra, Monza (IT); Andrea Redaelli, Milan (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 426 days.

(21) Appl. No.: 18/099,528

(22) Filed: Jan. 20, 2023

(65) Prior Publication Data
US 2023/0240160 A1  Jul. 27, 2023

(30) Foreign Application Priority Data
Jan. 24, 2022  (IT) .................. 102022000001130

(51) Int. Cl.
*H10N 70/00* (2023.01)
*H10N 70/20* (2023.01)
(52) U.S. Cl.
CPC ....... *H10N 70/8413* (2023.02); *H10N 70/011* (2023.02); *H10N 70/231* (2023.02); *H10N 70/826* (2023.02); *H10N 70/8828* (2023.02)

(58) Field of Classification Search
CPC .. H10N 70/231; H10N 70/235; H10N 70/826; H10N 70/8413
See application file for complete search history.

(56) References Cited

U.S. PATENT DOCUMENTS

| | | | |
|---|---|---|---|
| 2008/0185570 A1 | 8/2008 | Wu et al. | |
| 2014/0369113 A1 | 12/2014 | Krebs et al. | |
| 2020/0381618 A1* | 12/2020 | Cappelletti | G11C 11/54 |
| 2021/0135104 A1 | 5/2021 | Ok et al. | |

FOREIGN PATENT DOCUMENTS

| | | |
|---|---|---|
| CN | 101047230 A | 10/2007 |
| CN | 101442103 A | 5/2009 |
| CN | 222941178 U | 6/2025 |
| EP | 2034536 B1 | 9/2007 |

(Continued)

OTHER PUBLICATIONS

IT Search Report and Written Opinion for priority application, IT 102022000001130, report dated Sep. 27, 2022, 7 pgs.

(Continued)

*Primary Examiner* — Zandra V Smith
*Assistant Examiner* — Molly K Reida
(74) *Attorney, Agent, or Firm* — Crowe & Dunlevy LLC

(57) ABSTRACT

A phase-change memory cell includes a heater, a memory region made of a phase-change material located above said heater, and an electrically conductive element positioned adjacent to the memory region and the heater at a first side of the heater. The electrically conductive element extends parallel to a first axis and has, parallel to the first axis, a first dimension at the first side that is greater than a second dimension at a second side opposite to the first side.

24 Claims, 14 Drawing Sheets

(56) References Cited

FOREIGN PATENT DOCUMENTS

| | | |
|---|---|---|
| EP | 3745402 A1 | 5/2020 |
| EP | 3863074 A1 | 8/2021 |
| WO | 2022123367 A1 | 6/2022 |
| WO | 2022207630 A2 | 10/2022 |

OTHER PUBLICATIONS

EP Search Report for counterpart EP Appl. No. 23150733.6, report dated Jun. 6, 2024, 5 pgs.
CN First Office Action and Search Report for counterpart CN Appl. No. 202310042429.6, report dated Jul. 31, 2025, 9 pgs.

* cited by examiner

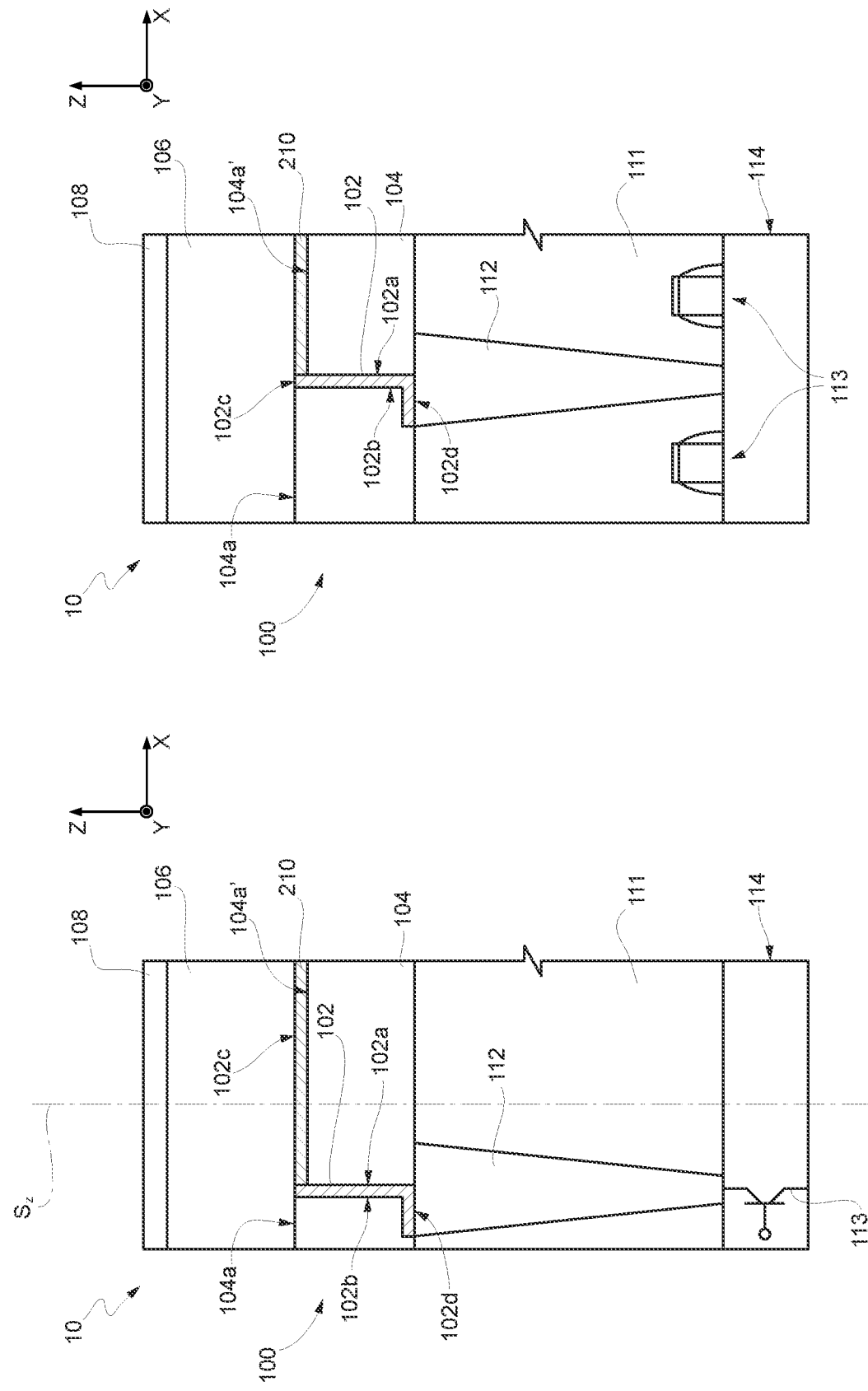

PHASE-CHANGE MEMORY CELL WITH ASYMMETRIC STRUCTURE, A MEMORY DEVICE INCLUDING THE PHASE-CHANGE MEMORY CELL, AND A METHOD FOR MANUFACTURING THE PHASE-CHANGE MEMORY CELL

PRIORITY CLAIM

This application claims the priority benefit of Italian Application for Patent No. 102022000001130 filed on Jan. 24, 2022, the content of which is hereby incorporated by reference in its entirety to the maximum extent allowable by law.

TECHNICAL FIELD

The present disclosure relates generally to a phase-change memory cell, a memory device including the phase-change memory cell, and a method for manufacturing the phase-change memory cell. The phase-change memory cell is, in particular, configured to support multibit storage.

BACKGROUND

Phase-change materials are materials which can switch, under the effect of heat, between a crystalline phase and an amorphous phase, or between different detectable states of local order across the entire spectrum between a completely amorphous state and a completely crystalline state. Since the electric resistance of an amorphous material is significantly greater than the electric resistance of a crystalline phase of the same material, such a phenomenon is used to define two memory states, for example, 0 and 1, differentiated by the resistance measured through the phase-change material.

As is known, phase change memory devices use phase change materials for electronic memory application. The state of the phase change materials is also non-volatile in that, when set in either a crystalline, semi-crystalline, amorphous, or semi-amorphous state representing a resistance value, that value is retained until changed by another programming event, as that value represents a phase or physical state of the material (e.g., crystalline or amorphous). The state is unaffected by removing electrical power.

At present, alloys of group VI of the periodic table, such as Te or Se, referred to as chalcogenides or chalcogenide materials, can advantageously be used in phase change cells as phase change materials. The most promising chalcogenide is formed by a Ge, Sb and Te alloy ($Ge_2Sb_2Te_5$), also called GST, which is currently widely used for storing information in overwritable disks.

In chalcogenides, the resistivity varies by two or more order of magnitude when the material passes from the amorphous phase (more resistive) to the crystalline phase (more conductive) and vice versa.

Phase change may be obtained by locally increasing the temperature. Below 150° C. all phases are stable. Above 200° C. (i.e., the temperature of start of nucleation), fast nucleation of the crystallites takes place, and, if the material is kept at the crystallization temperature for a sufficient length of time, it changes its phase and becomes crystalline (so-called set state). To bring the chalcogenide back into the amorphous state (reset state), it is necessary to raise the temperature above the melting temperature (approximately 600° C.) and then to cool the chalcogenide off rapidly. Intermediate phases may be obtained applying suitable temperatures for different times, which cause the formation of amorphous "spots" or "bubbles" of different dimensions in contact with the heater.

From the electrical standpoint, it is possible to cause the chalcogenide material to change state by causing a current to flow through a resistive element, called a heater, which heats the chalcogenide material by the Joule effect.

The basic structure of a PCM element 1 which operates according to the principles described above is shown in FIG. 1 and comprises a heater element 2 and a memory element 3 of chalcogenide material. A portion of the memory element 3 (generally crystalline or polycrystalline) is in thermal contact with the heater 2 and is subject to phase change between amorphous and crystalline. FIG. 1 shows a PCM element in an intermediate state, wherein the portion that has not changed phase and enables a good flow of current is referred to as crystalline portion 4 and the portion that has changed state is referred to as amorphous portion 5. The dimensions of the amorphous portion 5 define the overall resistivity of the memory region 3 and thus of the PCM element 1. Thus, different resistance levels may be associated with different bits and may be obtained by generating appropriate program currents that cause the amorphous portion 5 to assume different dimensions.

A conductive layer 7 (having a predefined electrical resistance, and therefore also referred to herein as the "resistive layer") is interposed between the memory element 3 and the heater 2, as well as between the memory element 3 and an insulating, or dielectric, layer 6, which laterally surrounds the heater 2. In other words, the resistive layer 7 is formed and rests both on the upper surface of the dielectric layer 6 and on the upper surface of the heater 2, the resistive layer 7 being in electrical contact with the heater 2. The memory element 3 is formed and rests on the upper surface of the resistive layer 7. The resistive layer 7 is, for example, made of any refractory metal and/or refractory metal nitride, such as TiN (titanium nitride), Ta (tantalum), TaN (tantalum nitride), or W (tungsten).

Reference is also made to FIGS. 2A-2D, showing the PCM element 1 of FIG. 1 in different programming conditions, obtained using progressively higher programming currents. In FIGS. 2A-2D, the same reference numbers have been used as in FIG. 1, while number 6 represents the layer of insulating or dielectric material that surrounds the heater 2.

As visible in FIGS. 2A-2D, the amorphous portions 5 have different dimensions (radiuses). In detail, in FIG. 2A, where a lower programming current ip was used (e.g., ip=160-200 µA), the phase change portion 5 extends just a little beyond the edge of the heater 2, while in FIGS. 2B, 2C, 2D (obtained with progressively higher programming currents ip—up to 300-350 µA) the protruding portion of the phase change portion 5 beyond the edge of the heater 2 is gradually bigger.

The current path from the heater 2 to the crystalline portion 4 is influenced by the high resistive amorphous portion 5; therefore, the current path resistance is very high in all four conditions. Thus, the difference in resistance among the four conditions is small, compared with its absolute value.

Moreover, the programmed resistance is entirely associated to the high resistivity of the amorphized portion.

European Patent No. 2034536B1 (incorporated herein by reference) discusses a multilevel architecture for PCM. Resistance of intermediate states between two programming states (also known as SET and RESET) is (geometrically) controlled by the volume of the amorphous portion 5.

During reading, the electrical current flows through two parallel paths (not shown) so as to circumvent the amorphous portion 5. That is to say that a read current flows in the resistive layer 7 instead of the amorphous portion 5. Each one of these two paths includes a respective one of the two branches of the resistive layer 7 that extend in an opposite direction from the upper surface of the heater 2, and are covered by the amorphous portion 5 (each branch having a resistance $R_L$). The amorphous volume of portion 5 only determines the length of the resistive layer 7 through which the reading current flows (and so the electrical resistance seen by the current) for a certain programmed state SET/RESET.

Benefits of this approach include that temperature dependence, drift and 1/f noise are drastically mitigated. However, a gap between the resistance values of the two states (SET/RESET) is reduced by the fact that, for every amorphous volume configuration, there exist two identical current paths in parallel (due to the symmetry of the layout of the resistive layer 7). For example, by defining: the resistance in the SET state as $R_{SET}=R_H$; the resistance in the RESET state as $R_{RESET}=R_H+R_L/2$ (where $R_L/2$ is the equivalent resistance of the portion of the resistive layer 7 through which the current flows during reading of the memory element 3 when programmed in the RESET state).

The ratio between $R_{RESET}$ and $R_{SET}$ represents the window W, or the gap, between the resistance values of the two states SET/RESET:

$$W = \frac{R_{RESET}}{R_{SET}} = 1 + \frac{R_L}{2 \cdot R_H}$$

The higher the window W, the easier the detection of the respective state SET/RESET during reading.

There is a need in the art to provide a phase-change memory cell, a memory device including the phase-change memory cell, and a method for manufacturing the phase-change memory cell, having an improved behavior and overcoming the above-mentioned drawbacks.

SUMMARY

In an embodiment, a phase-change memory cell comprises: a heater having a first lateral side and a second lateral side opposite to one another along a first axis, and a top side and a bottom side opposite to one another along a second axis orthogonal to the first axis; a memory region, made of a phase-change material, electrically and thermally coupled to the top side of the heater; and an electrically conductive element, having a resistive characteristic, that extends parallel to the first axis at the first lateral side, adjacent to the first lateral side of said heater and to said memory region.

An embodiment further comprises a memory device including the phase-change memory cell.

In an embodiment, a method for manufacturing the phase-change memory cell comprises: forming a heater having a first lateral side and a second lateral side opposite to one another along a first axis, and a top side and a bottom side opposite to one another along a second axis orthogonal to the first axis; forming a memory region, made of a phase-change material, electrically and thermally coupled to the top side of the heater; and forming an electrically conductive element, having a resistive characteristic, parallel to the first axis at the first lateral side, adjacent to the first lateral side of said heater and to said memory region.

BRIEF DESCRIPTION OF THE DRAWINGS

The foregoing features and advantages, as well as others, will be described in detail in the following description of specific embodiments given by way of illustration and not limitation with reference to the accompanying drawings, in which:

For a better understanding of the present invention, preferred embodiments thereof are now described, purely by way of non-limiting example and with reference to the attached drawings, wherein:

FIG. 7 is a simplified cross-section view of an example of a phase-change memory device including a phase-change memory cell according to a further embodiment;

FIG. 8 is a simplified cross-section view of an example of a phase-change memory device including a phase-change memory cell according to a further embodiment;

DETAILED DESCRIPTION

Like features are designated by like references in the various figures. In particular, the structural and/or functional features that are common among the various embodiments may have the same references and may dispose identical structural, dimensional and material properties.

For the sake of clarity, only the operations and elements that are useful for an understanding of the embodiments described herein have been illustrated and described in detail. In particular, the memory cells comprise elements which are not detailed, such as selection elements (transistors, for example) or electric connections.

Figure 1:
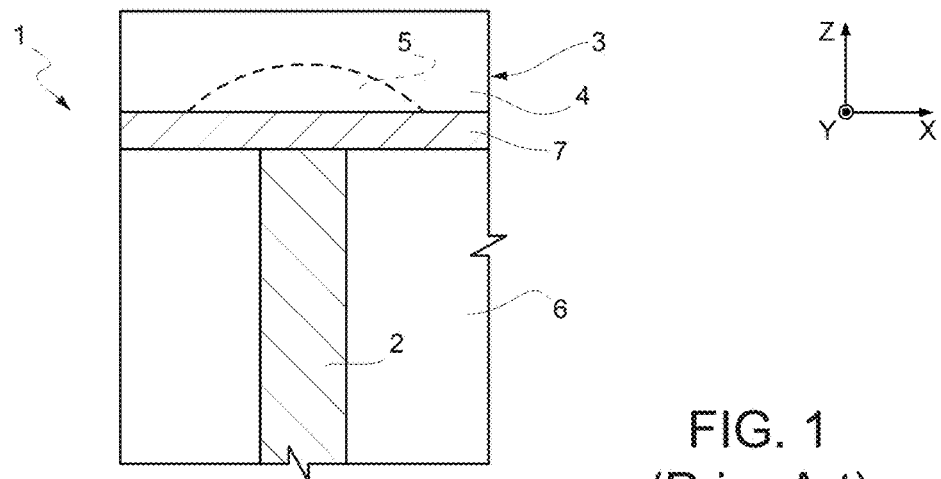
FIG. 1 shows an exemplary structure of a known phase change memory element.
Figure 2A:
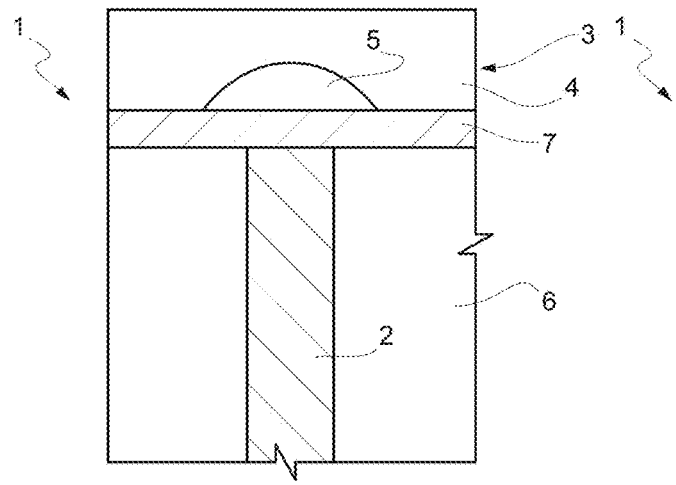
FIGS. 2A-2D show the phase change memory element of FIG. 1 in different programming conditions.
Figure 2B:
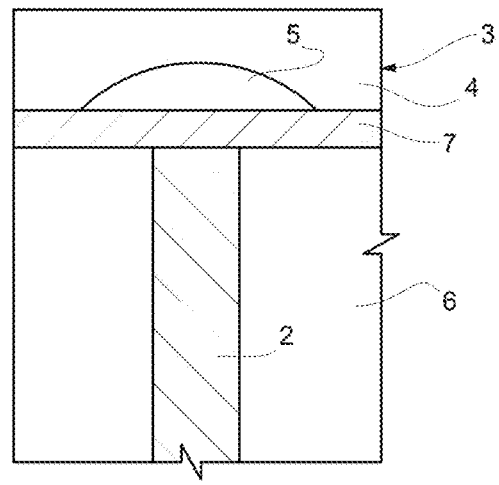
Figure 2C:
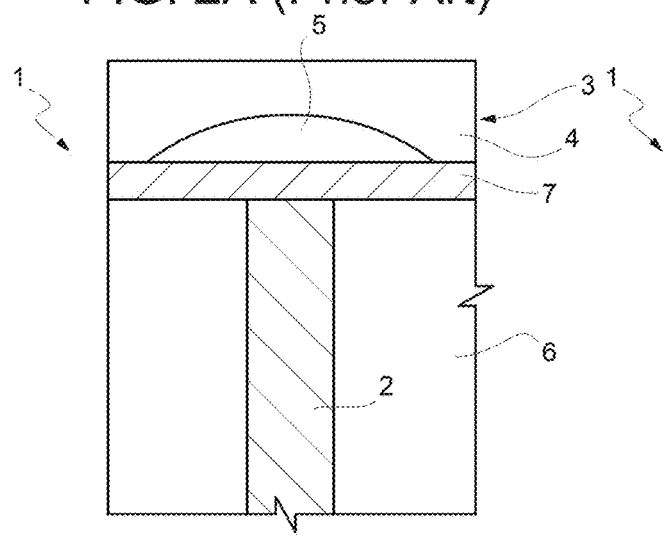
Figure 2D:
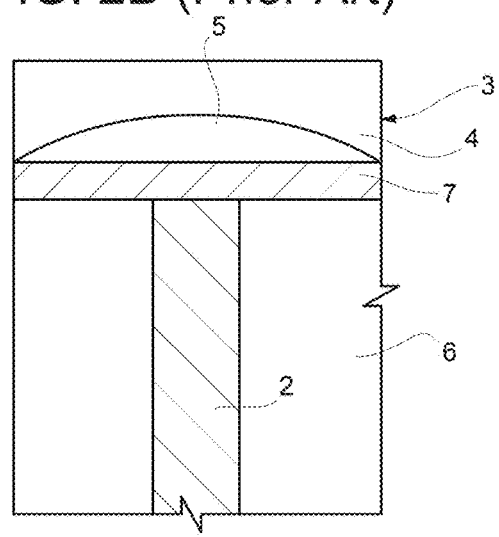
Figure 3:
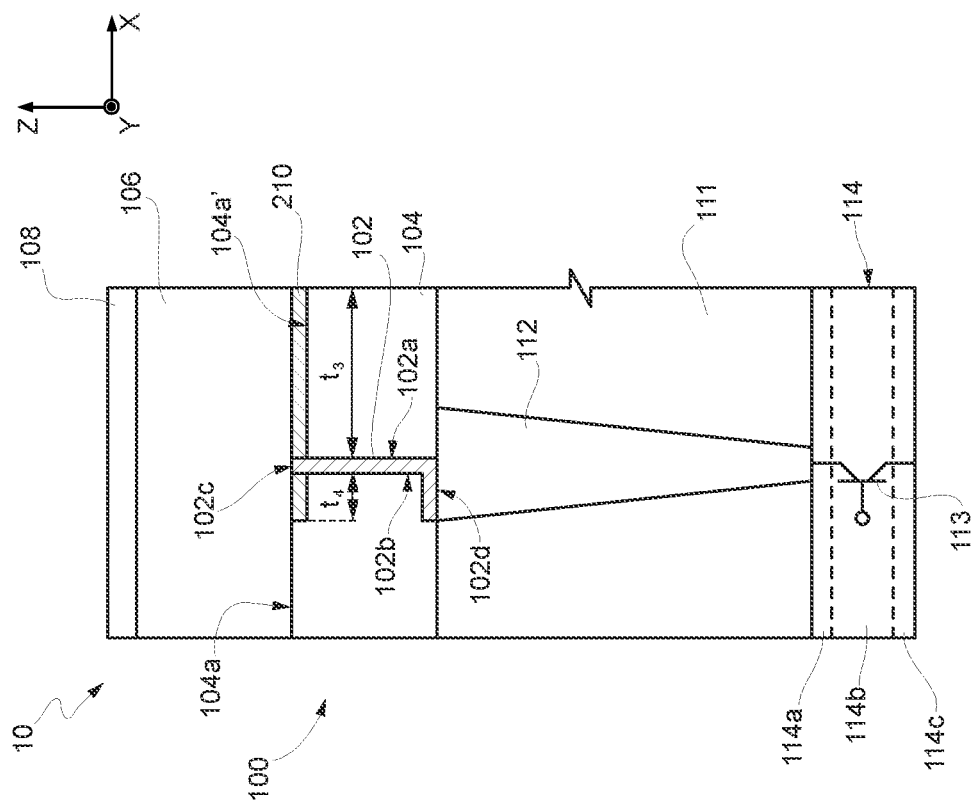
FIG. 3 is a simplified cross-section view of an example of a phase-change memory device including a phase-change memory cell.

FIG. 3 is a simplified perspective view of a memory cell 100, which is part of a phase-change memory (PCM) device 10 (only a portion of which is represented), the phase-change memory device 10 comprising a plurality of memory cells 100. FIG. 3 show the memory cell 100 in a triaxial system of mutually orthogonal axes X, Y, Z (Cartesian system).

Phase-change memory cells, such as memory cells 100 depicted in FIG. 3, are typically embedded in non-volatile memory (NVM) devices such as electrically erasable programmable read-only memories (EEPROM). The programming of each memory cell in such memory devices is usually performed upon manufacturing of the memory devices and can afterwards be modified several times, particularly during their use.

The memory cells 100 of the memory device 10 are arranged in a grid-like or matrix pattern. In other words, the memory device 10 is composed of an array of memory cells 100. Each memory cell 100 is located at the intersection of a row and a column of the array.

The columns, which are parallel to each other, are also referred to as "bit lines" (BL). The rows, which are parallel to each other and perpendicular to the bit lines, are also referred to as "word lines" (WL).

Each phase-change memory cell 100 of the memory device 10 comprises a heater 102 or resistive element. In the example of FIG. 3, the heater 102 has an L-shaped cross-section (therefore having a vertical portion extending along the Z axis and a horizontal portion extending along the X axis). However, other shapes are possible, such as a "I" shaped cross-section (where only the vertical portion is present).

The heater 102 is generally surrounded by one or more insulating or dielectric layers (only one layer 104 is represented in FIG. 3), typically composed of nitride (e.g., SiN) and/or oxide (e.g., $SiO_2$).

The upper surface 102c of the vertical portion of the heater 102 is coplanar with the upper surface 104a of the insulating layer 104. As better explained later, the thickness ti along Z axis of this insulating layer 104 is such that, at one side 102a of the heater 102, is less than the thickness $t_2$ of the insulating layer 104 at the opposite side 102b (along X axis) of the heater 102. The thickness $t_1$ is reduced with respect to thickness $t_2$ due to the presence of an electrically conductive layer 210 having a resistive characteristic (in the following, also referred to as "resistive lamina 210"). The resistive lamina 210 has a main extension along the X direction, and extends (or protrudes) from side 102a of the heater 102 away from the heater 102. The upper surface 104a' of the insulating layer 104 extending at the side 102a of the heater 102 is coplanar with the lower surface of the resistive lamina 210.

Each memory cell 100 further comprises an associated memory region 106, which is separated from other memory regions 106 by an interposed dielectric or insulating layer. This memory region 106 is made of a phase-change material. The memory region 106 is, for example, made of a chalcogenide material such as an alloy that belongs at the Tellurium-based chalcogenide alloys family, in particular an alloy including germanium (Ge), antimony (Sb) and tellurium (Te). Such alloy is known as "GST". There are others chalcogenide alloys families (selenium-based and sulfur-based) that can be used for manufacturing the memory region 106. In any case, embodiments herein are not limited to a specific material of the memory region 106.

Typically, a crystalline phase of the memory region 106 is native (that is to say after manufacturing/fabricating the memory cell 100 and before the beginning of writing/programming operations, memory region 106 is in a wholly crystalline state/phase). Accordingly, in the following description, the memory region 106 is also referred to as "crystalline layer 106".

The crystalline layer 106 is formed and rests both on the upper surface 104a of the insulating layer 104 and on the upper surface 102c of the vertical portion of the heater 102. The heater 102 is in electrical and thermal contact with the crystalline layer 106 through the vertical portion of the heater 102.

The heater 102 is, in the embodiment shown in FIG. 3, centered with respect to an axis of symmetry (parallel to the Z axis and orthogonal to the X axis) of the memory cell 100.

According to an embodiment, the resistive lamina 210, already mentioned, is interposed between a portion of the insulating layer 104 and a respective portion of the crystalline layer 106, laterally to the heater 102. The heater 102 is in electrical contact with the resistive lamina 210, in particular in direct electrical contact with the resistive lamina 210. In particular, the resistive lamina 210 is laterally connected to the heater 102 (i.e., it is connected to the heater 102 at the side 102a of the heater 102).

A conductive metallic layer 108 extends on top of the crystalline layer 106. This conductive layer 108 typically forms an electrode of the memory cell 100. Conductive vias (not shown) may be provided for connecting each electrode 108 to, for example, a metallization level located above the memory cells 100 of the memory device 10.

The conductive layer 108 forms an electrode (to be connected to the bit line) of the memory cell 100, while the heater 102 forms another electrode (to be connected to the word line) of the memory cell 100. The two electrodes are also referred to here as a "top" electrode 108 and a "bottom" electrode 102, though no limitation is implied as to memory cell 100 orientation in operation.

The heater 102 of the memory cell 100 is typically connected, by its foot 102d (that is to say a bottom surface of its horizontal portion), to a bottom contact or pillar 112 which is made of conductive material such as doped polysilicon or metal. This bottom contact 112 extends vertically through an insulating layer 111 and is connected to a substrate 114 that extends below the insulating layer 111.

The substrate 114 can have a multilayer structure, for example composed of three layers: a first layer 114a made of a thin silicon film, to which the bottom contacts 112 are connected; a second layer 114b made of a thin buried oxide; and a third layer 114c composed of a material suitable for providing mechanical support, also called "handle substrate".

The bottom contact 112 of each memory cell 100 is connected to one terminal of a selection element 113. The selection element 113, often termed selector or access device, provides the ability to address/select individually each memory cell 100 of the memory device 10.

In the example of FIG. 3, the selection element 113 is a bipolar junction transistor (BJT) device, with an emitter terminal electrically coupled to the bottom contact 112, a collector terminal electrically coupled to a common reference potential, typically a ground potential, and a base terminal that, in use, receives a bias voltage.

The crystalline phase of the memory region 106 corresponds, for example, to the logic value "1". Data storage inside the phase-change memory 10 is then carried out by writing/programming some of its memory cells 100, while other of its memory cells 100 are left in their native state (that is to say in a crystalline state).

For writing, or programming, into a given phase-change memory cell 100 of memory 10, this memory cell 100 is first selected by applying an appropriate voltage bias to the base terminal of the BJT. An electrical current then flows through the crystalline layer 106. The electrical potential or the intensity of this electric current is tuned so as to sufficiently increase the temperature of the heater 102 to heat, by Joule heating, an area of the crystalline layer 106 in contact with the upper end 102c of the heater 102. This causes at least part of the phase-change material to melt. When the potential pulse is abrupt, the electric current flow rapidly ends and, consequently, the local temperature of the phase-change material rapidly decreases, quenching the glassy structure of the melted part of the phase-change material. As a result, the electrical pulse has transformed a part of the phase-change material from a low resistive crystalline phase to a highly resistive amorphous state. It is assumed, for example, that this amorphous state corresponds to the logic value "0".

For reading a given phase-change memory cell 100, this memory cell 100 is first selected by applying an appropriate voltage bias to the base terminal of the BJT. A current, whose value is low enough to avoid any inadvertent phase change, is then flown through the cell 100 by applying an appropriate electrical potential by activating the selector element. An electrical resistance, between the electrode 108 and the heater 102, can then be measured. This electrical resistance reflects the value "0" or "1" that was previously stored in the memory cell 100.

The material of resistive lamina 210 may be selected as a trade-off between programming current and an ability to discern intermediate programming states represented by different resistance levels. The electrical resistance of the resistive lamina 210 is chosen according to the needs, for example about the value of the electrical resistance of the heater 210, and/or less than the electrical resistance of the amorphous region of the layer 106. More particularly, the resistivity value of lamina 210 is between the respective resistivity values of the crystalline and amorphous states of the phase change material of the crystalline layer 106. The resistivity of the lamina 210 can be significantly lower than the resistivity of the amorphous state of the phase change material. For example, resistivity of lamina 210 can be between about $\frac{1}{1000}$ times and $\frac{1}{10}$ times the resistivity of the amorphous state of the phase change material of layer 106. At the same time, the resistivity of the lamina 210 is higher than the resistivity of the crystalline state of the phase change material. In an embodiment, lamina 210 may be selected to have a resistivity in the range of about 1 mΩ·cm to 0.1Ω·cm. Example materials that may be utilized for lamina 210 may include, but are not limited to, carbon (C) and metallic compounds such as TiSiN, TiAlN, and SiC. Other materials traditionally used for resistors in the integrated circuit industry can also be employed. For example, the resistive lamina 210 can also be made of any refractory metal and/or refractory metal nitride, such as TiN (titanium nitride), Ta (tantalum), TaN (tantalum nitride), or W (tungsten).

The resistive lamina 210 has a thickness, along the Z axis, lower than 10 nm, preferably comprised between 1 and 10 nm, most preferably of 4-5 nm.

According to an embodiment, the resistive lamina 210 has an extension $t_3$, along the X axis in the cross section view of FIG. 3, which is greater at one side of the heater 102 with respect to the opposite side of the heater 102.

In particular, in the embodiment of FIG. 3, the resistive lamina 210 extends only at the side 102a of the heater 102 (the right-hand side in the FIG. 3), in electrical contact with the heater 102 at the side 102a (in particular, in direct electrical contact). At the opposite side 102b of the heater 102 (the left-hand side in the FIG. 3), the resistive lamina 210 is absent.

Figure 4:
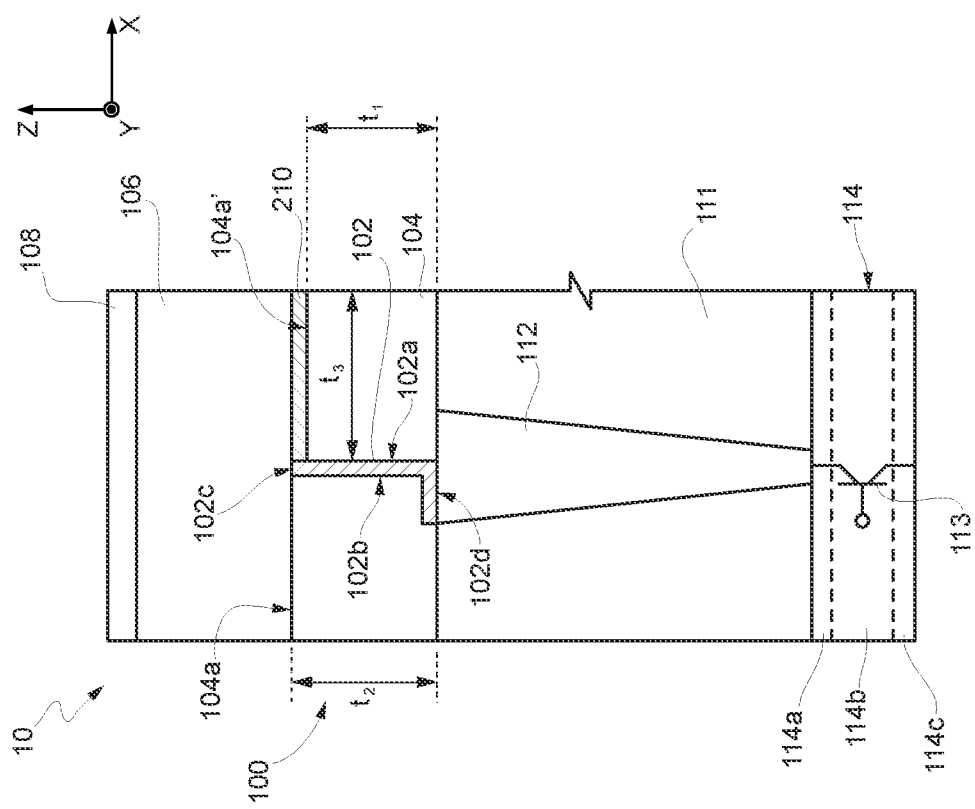
FIG. 4 is a simplified cross-section view of an example of a phase-change memory device including a phase-change memory cell according to a further embodiment.

According to a further embodiment, illustrated in FIG. 4, the resistive lamina 210 also extends at the second side 102b of the heater 102, and is in electrical contact with the heater 102 at both sides 102a and 102b (in particular, in direct electrical contact). In any case, as said above, a length $t_4$ (along X axis) of the portion of the resistive lamina 210 at the second side 102b of the heater 102 is less than the length $t_3$ (along X axis) of the portion of the resistive lamina 210 at the first side 102a of the heater 102. In particular, the length $t_3$ corresponds, along the X axis and at the side 102a of the heater 102, to the whole length of the crystalline layer 106 extending at the side 102a (i.e., the length of the layer 106 measured along X axis starting from side 102a until the end of the layer 106 of the memory cell 100 considered). The length t4 corresponds, along the X axis and at the side 102b of the heater 102, to a fraction of the length of the crystalline layer 106 extending at the side 102b (i.e., the length of the layer 106 measured along X axis starting from side 102b until the end of the layer 106 of the memory cell 100 considered).

Figure 5:
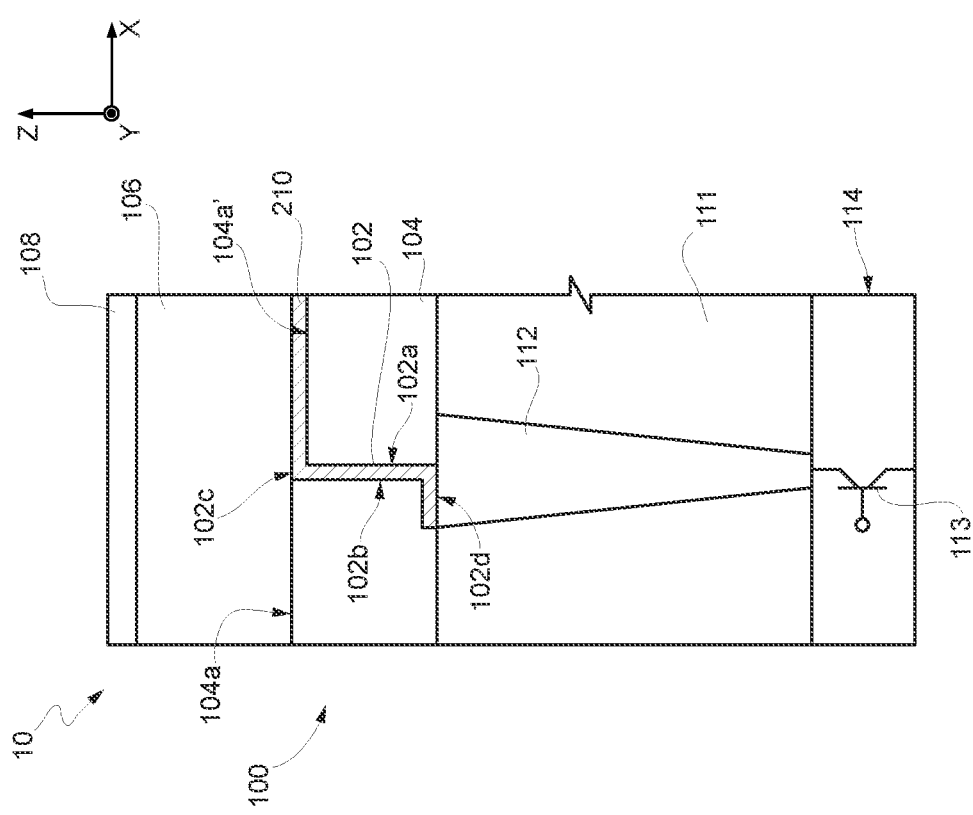
FIG. 5 is a simplified cross-section view of an example of a phase-change memory device including a phase-change memory cell according to a further embodiment.

In a further embodiment, shown in FIG. 5, the resistive lamina 210 is made integral with the heater 102 (as opposed to being made separate from the heater in FIGS. 3-4) and extends with continuity from the heater 102, in particular from side 102a of the heater 102. Therefore, in this embodiment, the resistive lamina 210 is made of the same material of the heater 102 and is formed during the same step of forming the heater 102.

As discussed with reference to FIG. 3 and FIG. 4, also in the embodiment of FIG. 5 the resistive lamina 210 has an extension $t_3$, along the X axis in the cross section view of FIG. 4, which is greater on one side (here, side 102a) of the heater 102 with respect to the opposite side (here, side 102b) of the heater 102. In particular, in the embodiment of FIG. 5, the resistive lamina 210 is present only at the side 102a and is absent at the side 102b.

Figure 6:
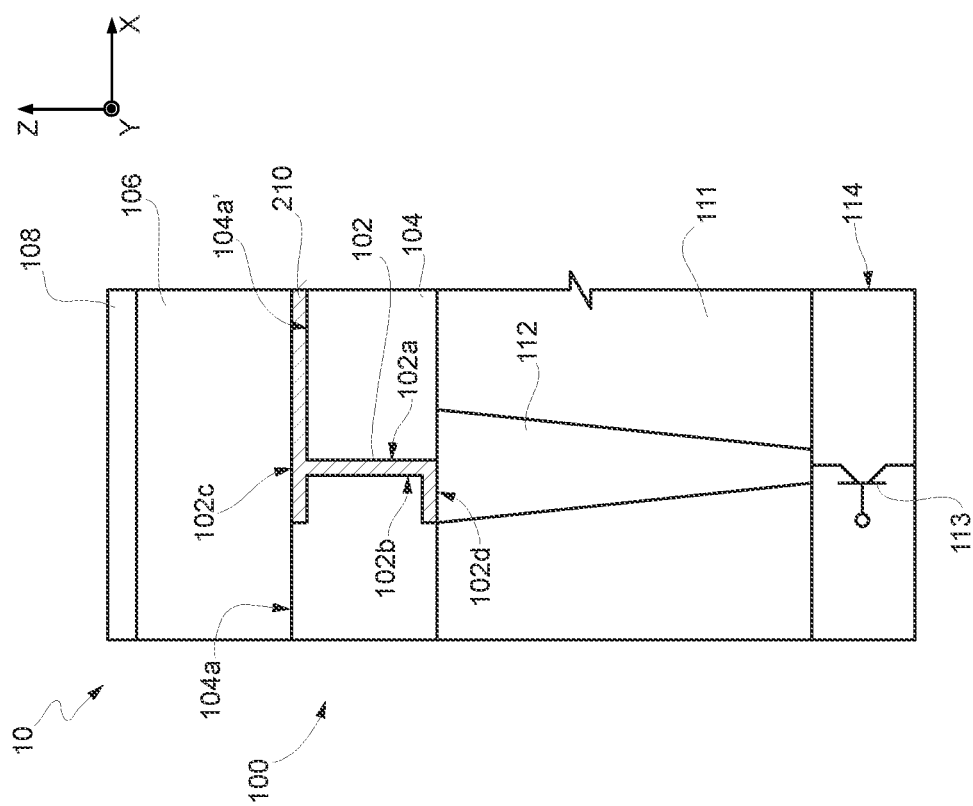
FIG. 6 is a simplified cross-section view of an example of a phase-change memory device including a phase-change memory cell according to a further embodiment.

In the embodiment of FIG. 6, which is based on the embodiment of FIG. 5, the resistive lamina 210 is integral with the heater 102 and also extends at both sides 102a and 102b of the heater 102. The length $t_4$ of the portion of the resistive lamina 210 at the side 102b is less than the length $t_3$ (along X axis) of the portion of the resistive lamina 210 at the first side 102a.

As shown in FIG. 7, according to a further embodiment, the heater 102 (in particular the vertical portion of the heater 102) is not centered with respect to the axis of symmetry of the memory cell 100 (represented in FIG. 7 and identified as $S_Z$), but staggered, or offset, with respect to such axis of symmetry; in other words, the heater 102 and the pillar 112 are shifted either to the left-hand side or to the right-hand side with respect to the axis of symmetry $S_Z$. Even though FIG. 7 shows the case where the resistive lamina 210 is not integral with the heater 102 (embodiments of FIGS. 3 and 4), the teaching of FIG. 7 applies to the embodiment in which the resistive lamina 210 is integral with the heater 102 (as in FIGS. 5 and 6).

Furthermore, also in the embodiment of FIG. 7 the resistive lamina 210 has an extension, along the X axis in cross section view, which is greater on side 102a of the heater 102 with respect to the opposite side 102b of the heater 102. In particular, the resistive lamina 210 may be present only at the side 102a and be absent at the second side 102b; or the resistive lamina 210 also extends at the second side 102*b* of the heater 102, wherein the length of the portion of the resistive lamina 210 at the second side 102*b* is less than the length (along X axis) of the portion of the resistive lamina 210 at the first side 102*a*.

As shown in FIG. 8, according to a further embodiment, the selection element 113 is a metal oxide semiconductor field effect transistor (MOSFET) device, having one conduction terminal (source or drain) electrically coupled to the bottom contact 112, the opposite conduction terminal (drain or source) electrically coupled to a common reference potential, typically a ground potential, and the gate that, in use, receives a bias voltage. According to its value, this bias voltage allows to enable or disable a current flow through the selector. In the example of FIG. 8, the select transistors of memory cells 100 belonging to a given word line or row share the same gate. In the memory device, the gates extend longitudinally along the WL direction (to the front and to the back, in FIG. 8). All the select transistors of memory cells of a given word line are consequently connected to a same gate. Both the conductive layers 108 and the gates hence form a matrix or grid-like pattern, in which each intersection is roughly vertically aligned with a memory cell 100.

When MOSFET devices are used as selector devices, dummy heaters (not shown) may be implemented to account for dimensions and electrical connections of the gates.

FIG. 8 is based on FIG. 3; however, a MOSFET as selector device 113 can be implemented to the embodiments of FIGS. 4-7 as well.

FIGS. 3-8 show respective embodiments where the resistive lamina 210 has a greater length (along the X axis) at the right-hand side 102*a* of the heater 102 with respect to the left-hand side 102*b* (where the lamina 210 can even be absent). However, the teaching of the present description applies analogously to embodiments (not shown) where the resistive lamina 210 extends only from the left-hand side 102*b* of the heater 102, or has a greater length (along the X axis) from the left-hand side 102*b* of the heater 102 with respect to the right-hand side 102*a*. Analogously, a memory device 10 may comprise a plurality of memory cells 100, wherein one or more (but not all) of such memory cells 100 include one respective resistive lamina 210 extending only from the right-hand side 102*a* of the respective heater 102, or have a greater length (along the X axis) from the right-hand side 102*a* of the heater 102 with respect to the left-hand side 102*b*; the remaining one or more memory cells 100 of such memory device 10 extend only from the left-hand side 102*b* of the heater 102, or have a greater length (along the X axis) from the left-hand side 102*b* of the heater 102 with respect to the right-hand side 102*a*. See for example FIG. 10I, where a portion of a device 10 is shown, including some heaters 102 with a respective resistive lamina 210 extending from the right-hand side 102*a* and other heaters 102 with a respective resistive lamina 210 extending from the left-hand side 102*b* of the heater 102.

Writing operations are discussed with reference to FIG. 9A-9C, where only a portion of the phase-change memory 10 of FIG. 3 is shown (in particular, a detail of the phase-change cell 100). For writing in the memory cell 100, a voltage is applied between the top electrode 108 (conductive layer) and the bottom electrode, or heater 102. This voltage gives rise to an electric current flowing through the layer 106, which is initially wholly made of the crystalline phase. The memory cell 100 is thus heated, by the heater 102, up to a temperature sufficient to amorphize at least part 105*a* of the crystalline layer 106.

Figure 9A:
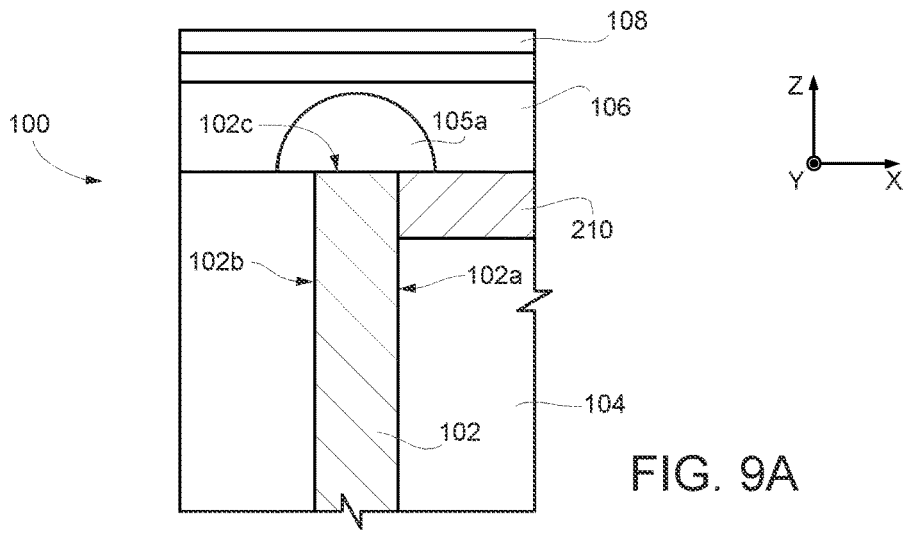
FIGS. 9A-9C show three simplified cross-sections views of various steps of a method of writing into the phase-change memory cell of FIG. 3, or of FIGS. 4-8.
Figure 9B:
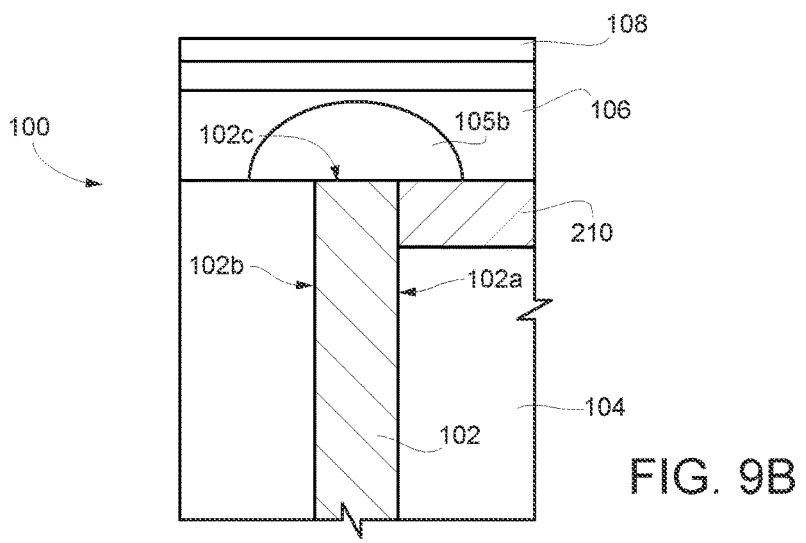

In the view of FIG. 9B, Joule heating due to the electric current flowing through the memory cell 100 makes a bigger part 105*b* of the layer 106 change phase, thereby forming a greater amorphous region above the upper surface 102*c* of the heater 102. The amorphous region forms a dome which is vertically aligned with the upper surface 102*c* of the vertical portion of the heater 102.

Figure 9C:
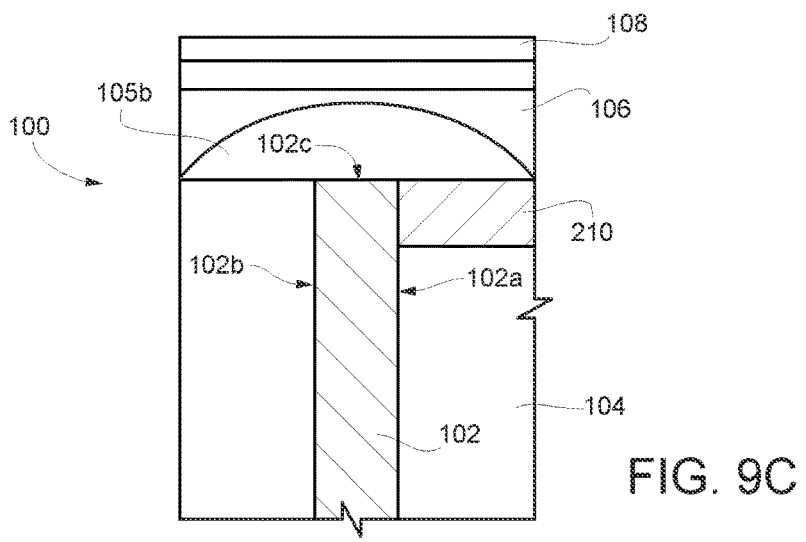

In the view of FIG. 9C, increased heating, obtained with proper increased electric current flowing through the memory cell 100, makes a still greater part 105*c* of the layer 106 change phase, thereby forming a still greater amorphous region above the upper surface 102*c* of the heater 102. The process during which crystalline GST is turned into amorphous GST can lead to a situation where the upper surface of the resistive lamina 210 is fully covered by amorphous GST.

In the amorphous region located directly above the heater 102, the GST of which the layer 106 is made of has changed/switched phase, due to heating, from a crystalline phase to an amorphous state. The layout of the resistive lamina 210, which in this example extends only at one side of the heater 102, has no impact on the formation of the amorphous regions 105*a*-105*c*. The shape and location of the amorphous region is, in fact, a function of the arrangement of the heater 102. If a memory cell, like the memory cell 100 as depicted in FIGS. 9A-9C, is selected for reading and if the appropriate voltage bias is applied between the top electrode 108 and the bottom electrode (or heater 102), the electrical reading current flows through the layer 106, to reach the resistive lamina 210 present at one side of the heater 102.

The memory cell 100 enables multilevel programming, as shown in FIGS. 9A-9C. In this case, it is assumed that the voltage, applied between the top electrode 108 and the bottom electrode during the writing (programming) operation, is raised in order to increase the intensity of the electric current flowing through the layer 106. This results in a temperature rise inside the layer 106, thus causing the phase change to carry on within the crystalline phase around the already amorphized region. More and more of the crystalline GST, contained inside the crystalline region, is therefore progressively converted into amorphous GST which results in a progressively extended amorphous region as the programming current progressively increases.

Consistently, the extent of the part of the resistive lamina 210 covered by the amorphous region also enlarges (as shown progressively in FIGS. 9A-9C) and its resistance increases, roughly proportionally to a length of the surface of the lamina 210 that is covered by the amorphous region. Therefore, the reading resistance of the cell 100 also increases.

With the above-described embodiments, the resistive lamina 210 is asymmetric at least along one axis (here, the X axis). In particular, introducing an asymmetry with the resistive lamina 210 forces the reading current to flow only in a specific direction, namely where the resistive lamina 210 is present. With this solution, the window W, or gap, between the resistance values of two states SET/RESET (as well as intermediate programmed states as in a multi-states memory for multibit storage) is increased with respect to the known solutions. In particular, if the resistance in the SET state is $R_{SET}=R_H$, the resistance in the RESET state is $R_{RESET}=R_H+R_L$ (where $R_L$ is the resistance of the portion of the resistive lamina 210 through which the current flows during reading).

The ratio between $R_{RESET}$ and $R_{SET}$ that defines the window W is:

$$W = \frac{R_{RESET}}{R_{SET}} = 1 + \frac{R_L}{R_H},$$

which is increased by a factor 2 with respect to the solution of the known art.

FIGS. 10A-10I show, in cross section view, steps for manufacturing the phase-change memory device 10, according to one embodiment.

Figure 10A:
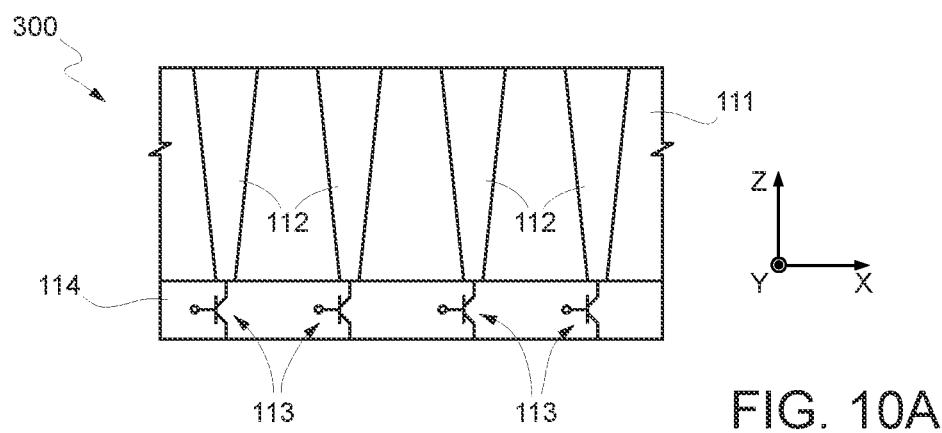
FIGS. 10A-10I show process steps carried out on a wafer for manufacturing the phase-change memory device of FIG. 3.

With reference to FIG. 10A, a wafer 300 is provided, which has already been subject to manufacturing steps known in the art and therefore not further detailed. In particular, the wafer 300 includes the substrate 114 with selector devices 113 (here, BJTs), over which the insulating layer 111 has been formed. The insulating layer 111 is, for example, made of Silicon Oxide, or other insulating or dielectric material. Through the insulating layer 111, a plurality of the bottom contacts, or pillars, 112 (made of conductive material such as metal or doped polysilicon) extend. The pillars 112 are, for example, formed by etching trenches in the insulating layer 111 and then filling such trenches with conductive material. The bottom contacts 112 extend through the insulating layer 111 for the entire thickness of the insulating layer 111.

Figure 10B:
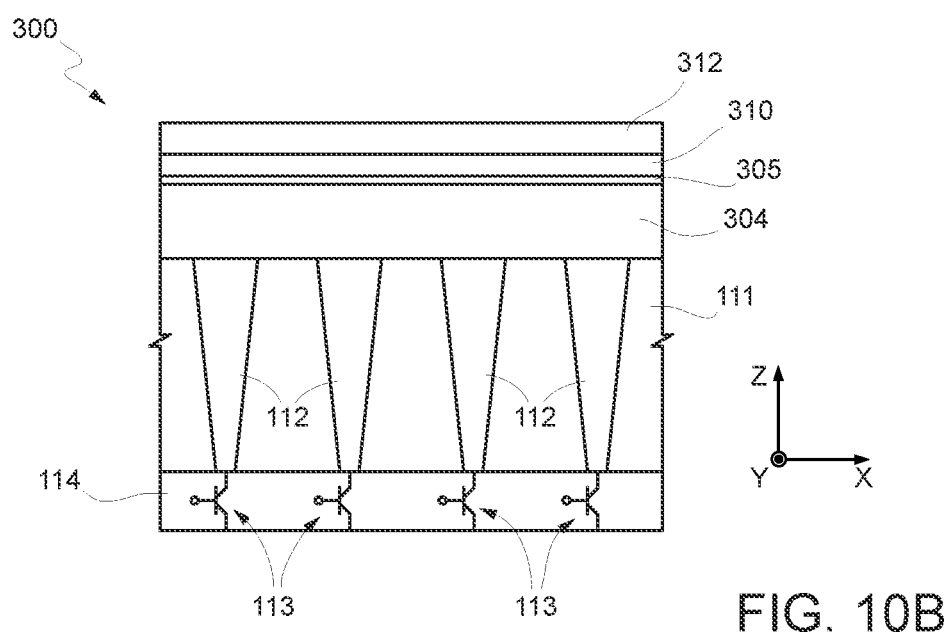

With reference to FIG. 10B, a step of depositing a further insulating or dielectric layer 304 on the insulating layer 111 is carried out; the insulating layer 304 is, in this embodiment, made of Silicon Nitride (SiN). Then, a step is carried out to form (e.g., by deposition), on the insulating layer 304, a resistive layer 305. Here, at this step of the process, the resistive layer 305 is a continuous strip or sheet of conductive material, extending on the entire surface of the insulating layer 304. In further steps of manufacturing, described later, the resistive layer 305 will form the already described resistive lamina 210. On the resistive layer 305, a further insulating layer 310 is formed by depositing, for example, the same material of the insulating layer 304. Therefore, the resistive layer 305 is actually buried between two dielectric layers. On the insulating layer 310, a masking layer 312 is formed, for example by depositing TEOS.

Figure 10C:
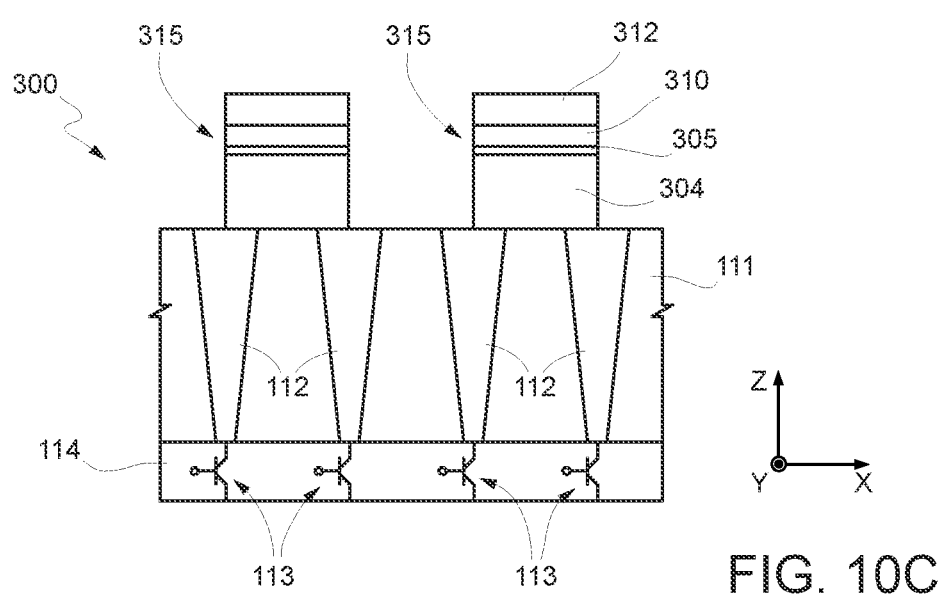

Then, FIG. 10C, the masking layer 312 is patterned to form an etching mask that is used to remove selective portions of the underlying layers, i.e., of the two dielectric layers 304, 310 and of the buried resistive layer 305. This etching step removes unmasked portions of such layers until respective surface regions of the insulating layer 111 are exposed. In detail, the mask 312 and the etching step are designed so that the remaining portions of the two dielectric layers 304, 310 and of the buried resistive layer 305 (masked stack 315) extend in a strip-like fashion along the Y axis in top-plan view (on the XY plane) and are separated from one another along the X axis by the spaces left by the removed portions. Each one of the masked stacks 315 extends, along the X axis, from one pillar 112 to another immediately subsequent pillar 112, only partially covering the surface of such two pillars. Two immediately subsequent pillars 112 along the X axis are partially covered by only one respective masked stacks 315.

Figure 10D:
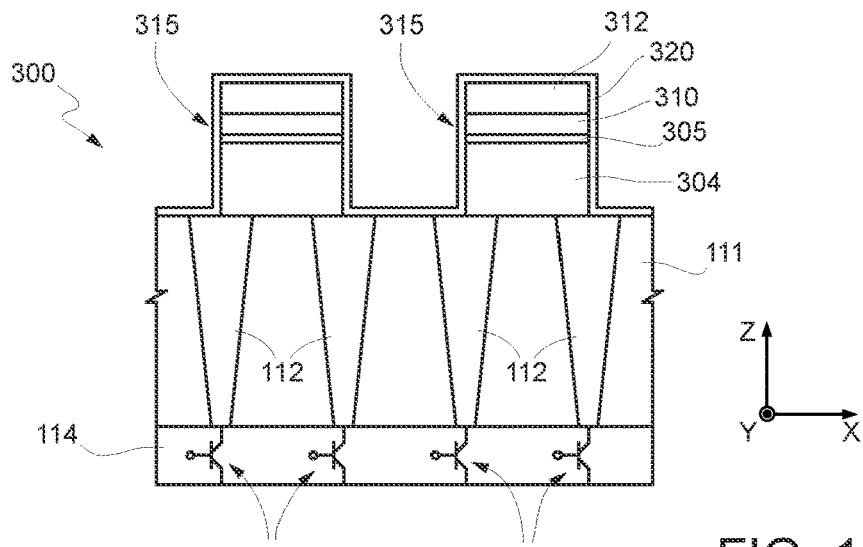

A shown in FIG. 10D, a step of depositing a continuous layer of resistive material 320 is carried out. The layer of resistive material 320 covers the masked stacks 315, the exposed surface of the pillars 112 and the exposed surface of the insulating layer 111 between the pillars 112. This layer of resistive material 320 will form, in subsequent steps, the plurality of heaters 102. Therefore, the material of layer 320 as well as its thickness are chosen according to the needs and/or design requirements for the heaters 102. For example, the material is made of TiSiN and the thickness is in the range 3.5 to 6 nm.

Figure 10E:
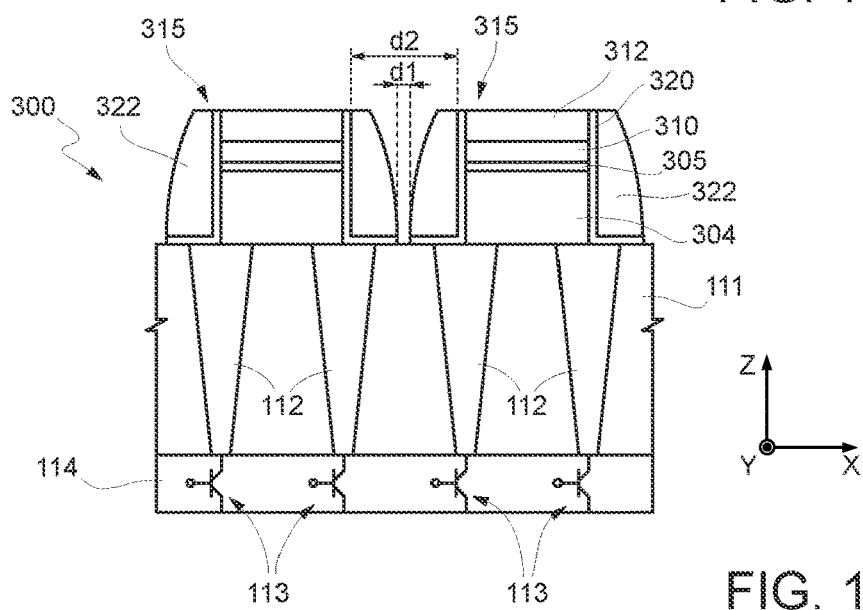

Then, FIG. 10E, an insulating layer 322 (e.g., made of Silicon Nitride) is deposited to cover the masked stacks 315 and the spaces between the masked stacks 315. A masked etching step is then carried out to remove selective portions of the insulating layer 322 above the masked stacks 315 and between the masked stacks 315. The portion of the insulating layer 322 that is removed between each couple of masked stacks 315 has an extension $d_1$, along the X axis, which is less than the distance $d_2$, along the X axis, between such masked stacks 315. The etching of the insulating layer 322 is carried out for the entire thickness of the insulating layer 322, exposing respective surfaces of the underlying resistive layer 320. The resistive layer 320 has, during the etching of the insulating layer 322, the function of an etch-stop layer. Then, a further etching step is carried out to remove the portions of the exposed resistive layer 320 through its entire thickness. This etching step can be unmasked due to the etching selectivity of the materials of the resistive layer 320 and the insulating layer 322.

Figure 10F:
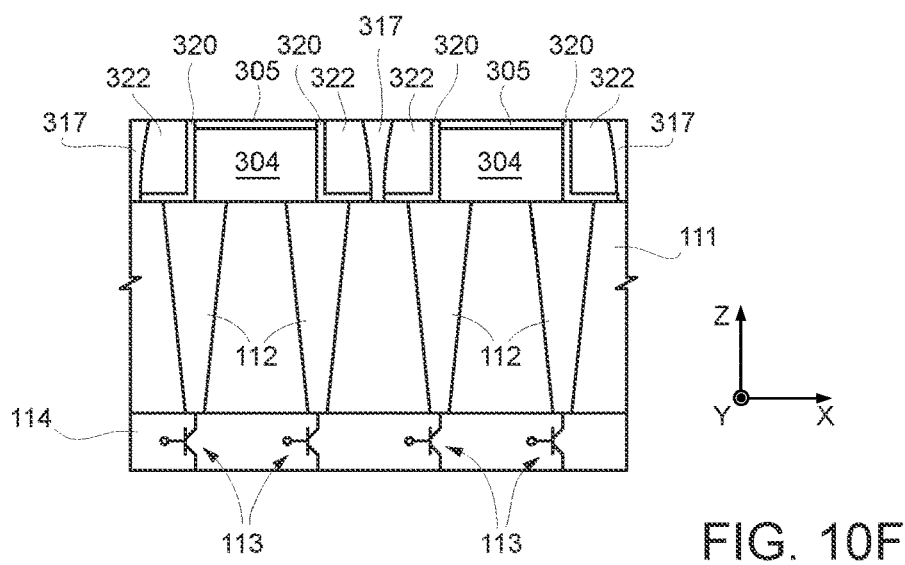

Then, FIG. 10F, a further step of filling the gaps between the masked stacks 315 is carried out, to fill with insulating material 317 the openings left by the etching steps described with reference to FIG. 10E.

A step is then carried out to remove the mask 312 from each masked stack 315 and to remove the insulating layer 310, until the resistive layer 305 is exposed. This step can be carried out by means of etching chemicals that selectively remove the layers 312 and 310, or through a CMP step configured to land on the resistive layer 305 without damaging or excessively removing the resistive layer 305.

Figure 10G:
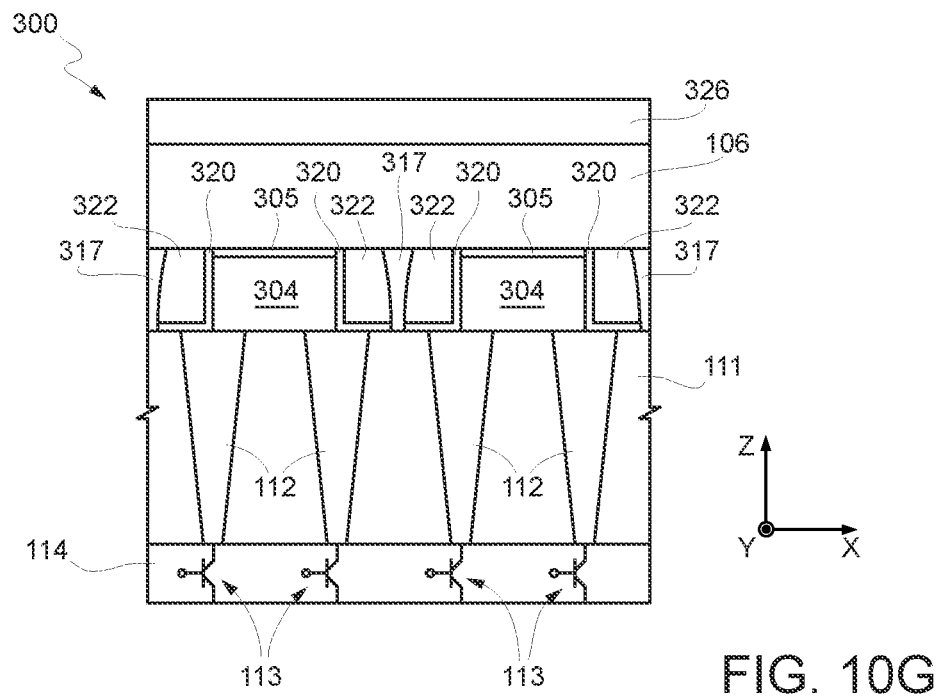

Then, FIG. 10G, steps of forming the memory regions are carried out. To this end, the crystalline layer 106 is deposited; the crystalline layer 106 is made of a phase-change material, in particular of a chalcogenide material, such as GST alloy. A sealing layer 326, e.g., made of Silicon Nitride, is deposited on the crystalline layer 106 and is used as a mask for the subsequent step of FIG. 10H.

Figure 10H:
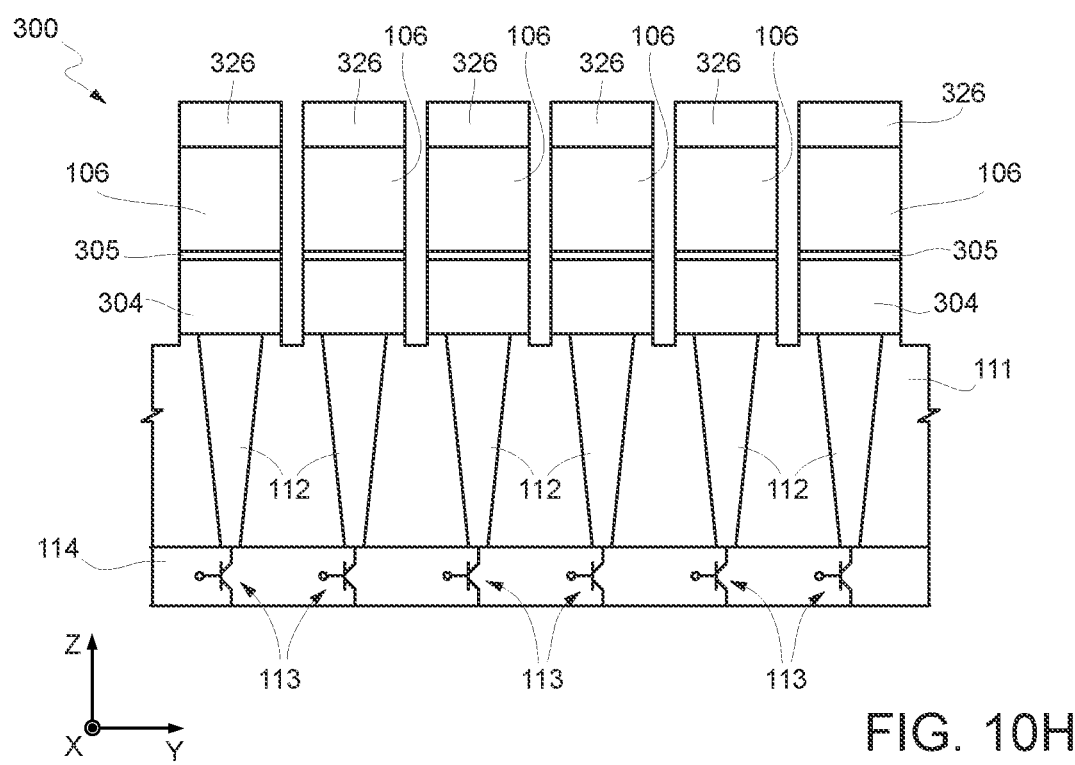

FIG. 10H shows the wafer 300 in a cross section taken along the Y axis, to better appreciate the etching step that is used to define grid-like or matrix pattern of the memory cells 100. With this step, the crystalline layer 106 and the underlying resistive and insulating layers 305, 304, are patterned along the Y axis, to form a plurality of memory regions (identified with the same reference numeral 106) physically separated from one another and coupled each one to a respective resistive lamina 210 (layer 305) and a respective heater 102 (which is not represented in the cross section of Figure H).

Figure 10I:
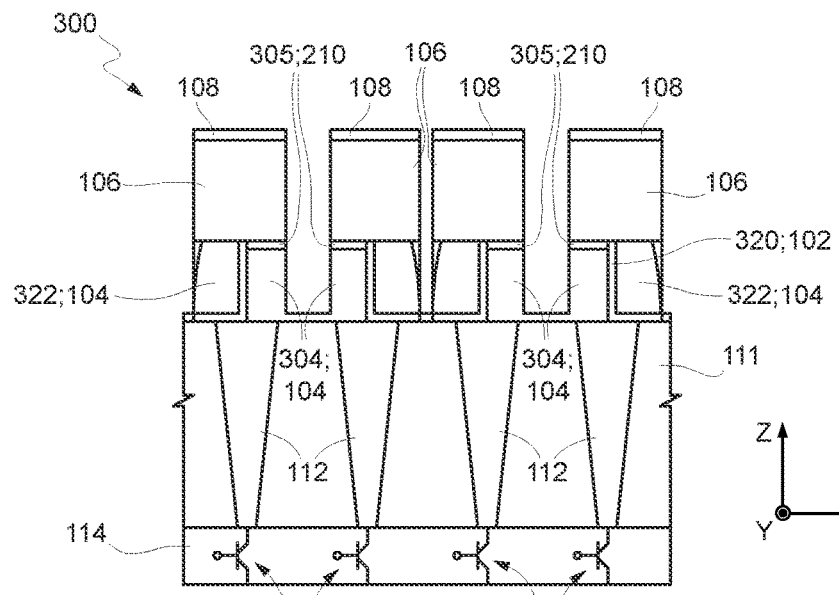

FIG. 10I shows the wafer 300 in cross section view along the XZ plane, to appreciate that each memory region 106 is coupled to one respective heater 102 and to one respective resistive lamina 210, which departs from one side only of the heater 102, leaving the other, opposite, side free from remains of the resistive layer 305.

The manufacturing of the memory device 10 can then be completed by forming the conductive metallic layer 108 on top of the crystalline layer 106, and filling the apertures with dielectric or insulating layer(s) (not shown). Proper electrical connection can then be formed. These steps are not, per se, part of the present invention and are therefore not further discussed.

Insulating layers 322 and 304 form the insulating layer 104 previously described.

Figure 11A:
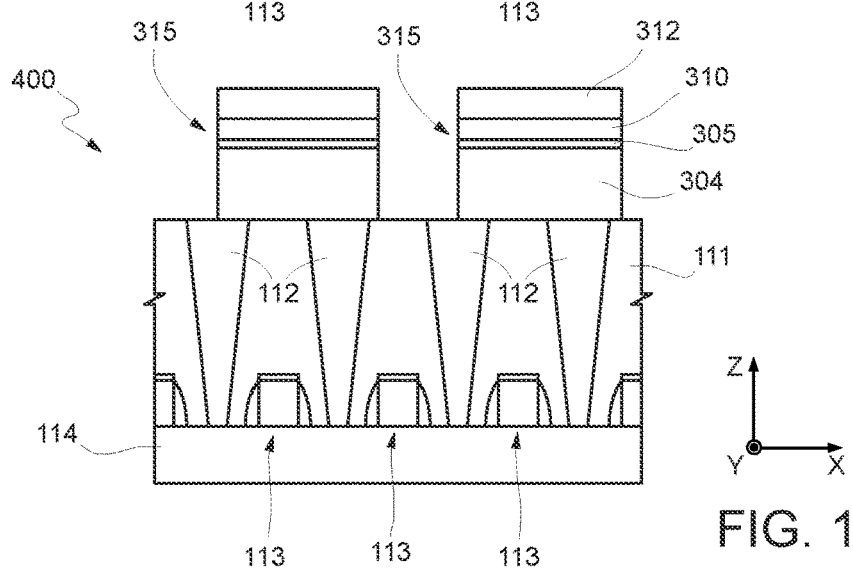
FIGS. 11A-11C show process steps carried out on a wafer for manufacturing the phase-change memory device of FIG. 8.
Figure 11B:
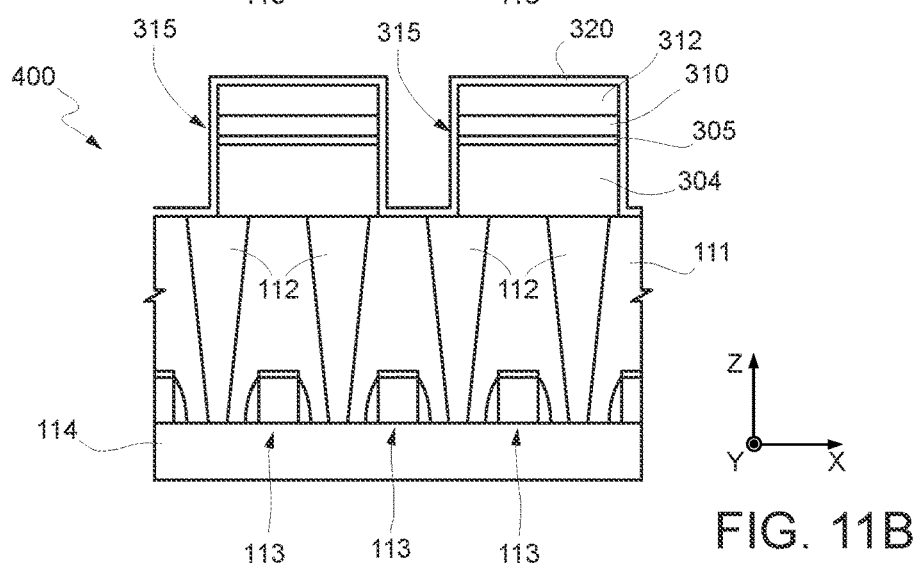
Figure 11C:
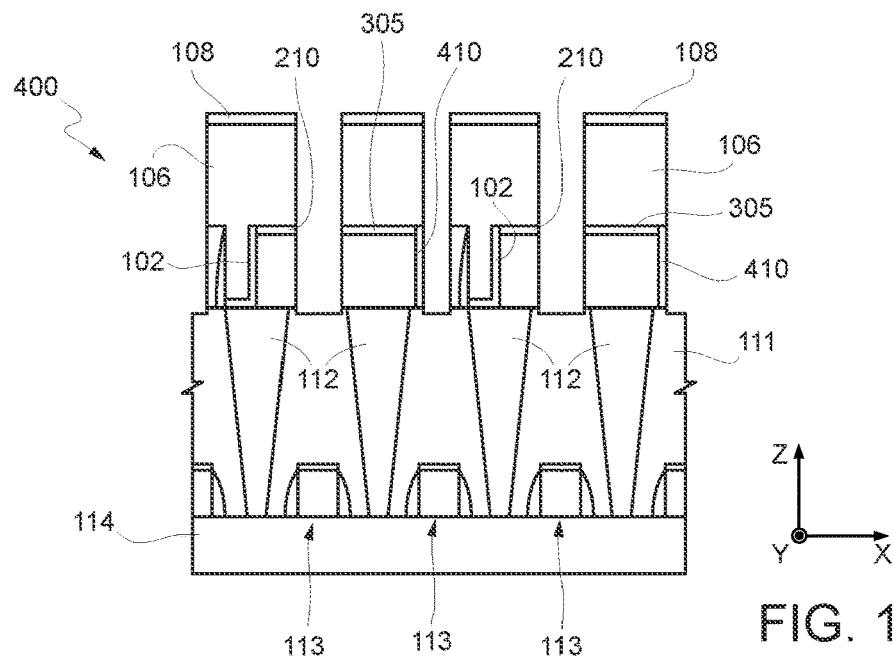

FIGS. 11A-11C show steps for manufacturing a memory device 10 wherein the selection element 113 is a MOSFET device (as discussed with reference to FIG. 8).

Only some manufacturing steps are shown and described, since the manufacturing process is in part analogous to that of FIGS. 10A-10I, already discussed. Like elements are identified with the same reference numerals.

With reference to FIG. 11A, a wafer 400 is provided, already processed as described with reference to FIGS. 10A-10B. The masking layer 312 is patterned to form an etching mask that is used to remove selective portions of the underlying layers, i.e., of the two dielectric layers 304, 310 and of the buried resistive layer 305. This etching step removes unmasked portions of such layers until respective surface regions of the insulating layer 111 are exposed. In detail, the mask 312 and the etching step are designed so that the remaining portions of the two dielectric layers 304, 310 and of the buried resistive layer 305 (masked stack 315) extend in a strip-like fashion along the Y axis in top-plan view (on the XY plane) and are separated from one another along the X axis by the spaces left by the removed portions, as in the FIG. 10C. However, here, each one of the masked stacks 315 extends, along the X axis, from one pillar 112 (only partially covering the surface of such pillar 112) to another immediately subsequent pillar 112, fully covering the surface of such subsequent pillar 112.

A shown in FIG. 11B, a step of depositing a continuous layer of resistive material 320 is carried out, analogously to FIG. 10D. This layer forms, in further steps, the heater 102.

The steps described with reference to FIGS. 10D-10H are carried out analogously for manufacturing the memory device of FIG. 8 and therefore are not further described nor shown in detail.

After steps analogous to those described with reference to FIG. 10H, the embodiment of FIG. 11C is obtained, where dummy heaters 410 are present alternated, along X axis, to proper heaters 102 (the dummy heaters 410 are not working, since they are not electrically connected to pillars 112).

The manufacturing of the memory device 10 can then be completed by forming the conductive metallic layer 108 on top of the crystalline layer 106, and filling the apertures with dielectric or insulating layer(s) (i.e., completing the formation of insulating layer 104). Proper electrical connection can then be formed. These steps are not, per se, part of the present invention and are therefore not further discussed.

FIGS. 12A-12H show steps for manufacturing the memory device of FIG. 6, where the resistive lamina 210 extends from the heater 102 as an integral part of the heater 102.

Figure 12A:
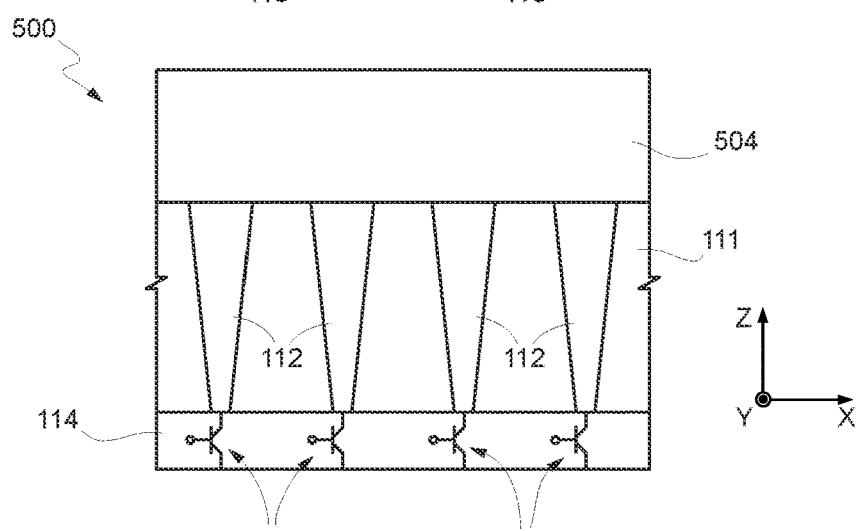
FIGS. 12A-12H show process steps carried out on a wafer for manufacturing the phase-change memory device of FIG. 5.

With reference to FIG. 12A, a wafer 500 is provided, which has already been subject to manufacturing steps known in the art and therefore not further detailed. In particular, the wafer 500 has been processed to form, in the substrate 114, the selectors 113 (here, BJT selector devices 113); over the substrate 114, the insulating layer 111 has been formed. The insulating layer 111 is, for example, made of Silicon Oxide, or other insulating or dielectric material. Through the insulating layer 111, a plurality of the bottom contacts, or pillars extending in respective trenches, 112 (made of conductive material such as metal or doped polysilicon) are formed. The bottom contacts 112 extend through the insulating layer 111 for the entire thickness of the insulating layer 111.

A step of depositing a further insulating or dielectric layer 504 on the insulating layer 111 is carried out; the insulating layer 504 is, in this embodiment, made of Silicon Nitride (SiN).

Figure 12B:
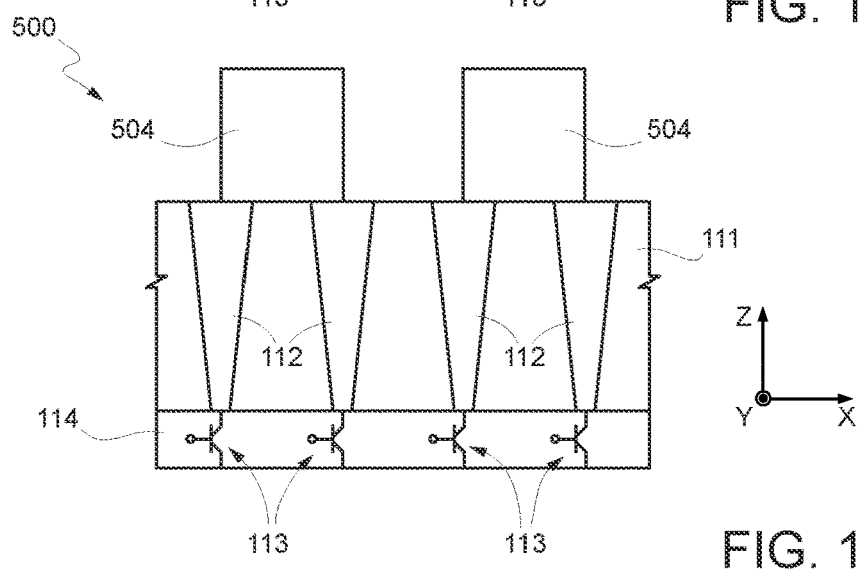

Then, FIG. 12B, the insulating layer 111 is patterned (e.g., by photolitographic and etching processes). The etching step removes unmasked portions of the insulating layer 504 until respective surface regions of the insulating layer 111 are exposed. In detail, the patterning is designed so that the remaining portions of the dielectric layer 504 extend in a strip-like fashion along the Y axis in top-plan view (on the XY plane) and are separated from one another along the X axis by the spaces left by the removed portions. Each one of the remaining portions of the dielectric layer 504 extends, along the X axis, from one pillar 112 to another immediately subsequent pillar 112, only partially covering the surface of such two pillars. Two immediately subsequent pillars 112 along the X axis are partially covered by only one respective remaining portion of the dielectric layer 504.

Figure 12C:
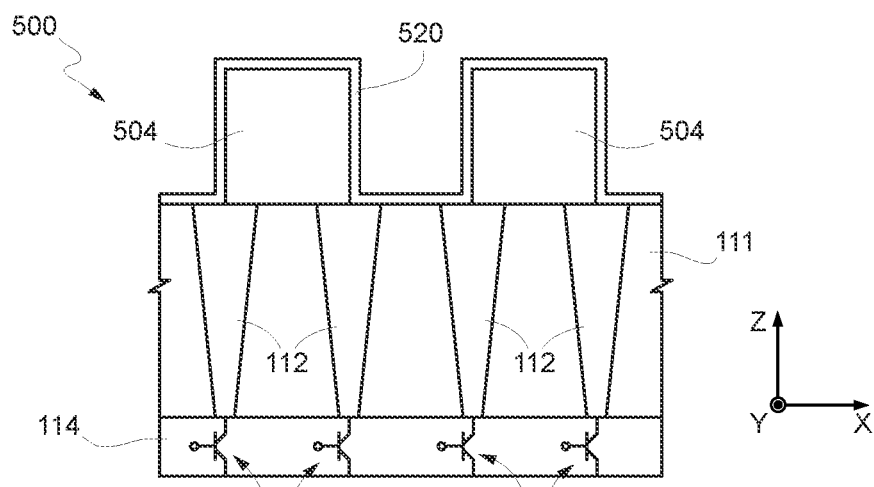

As shown in FIG. 12C, a step of depositing a continuous layer of resistive material 520 is carried out. The layer of resistive material 520 covers the portions of the dielectric layer 504, the exposed surface of the pillars 112 and the exposed surface of the insulating layer 111 between the pillars 112. This layer of resistive material 520 will form, in subsequent steps, the plurality of heaters 102 as well as the resistive laminas 210. Therefore, the material of layer 520 as well as its thickness are chosen according to the needs and/or design requirements for the heaters 102 and of the resistive laminas 210. For example, the material is made of TiSiN and the thickness is in the range 3.5 to 6 nm.

Figure 12D:
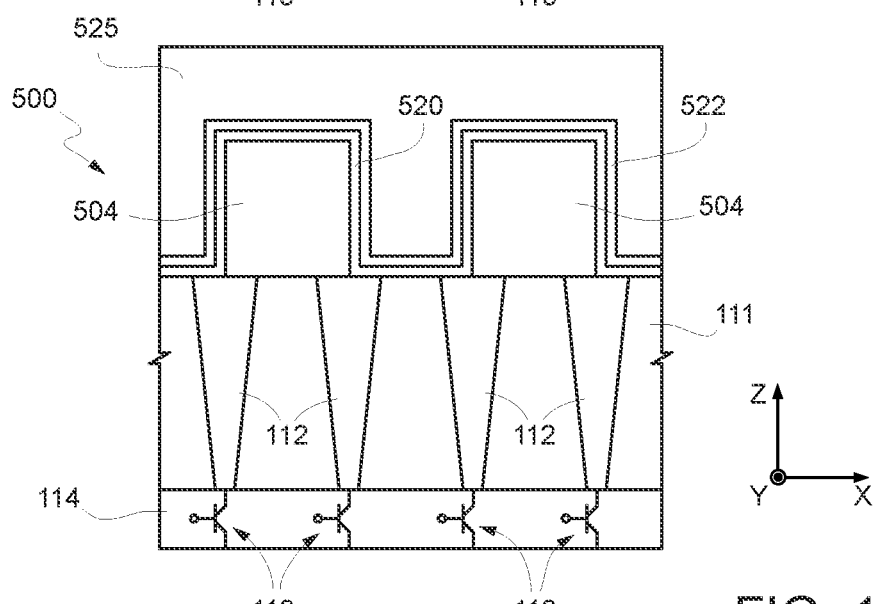

Then, FIG. 12D, a protection layer 522 (e.g., made of Silicon Nitride) is deposited to cover the layer of resistive material 520. Then, a further step of depositing a filling layer 525 is carried out, filling the gaps between the portions of the dielectric layer 504 and covering the portions of the dielectric layer 504.

Figure 12E:
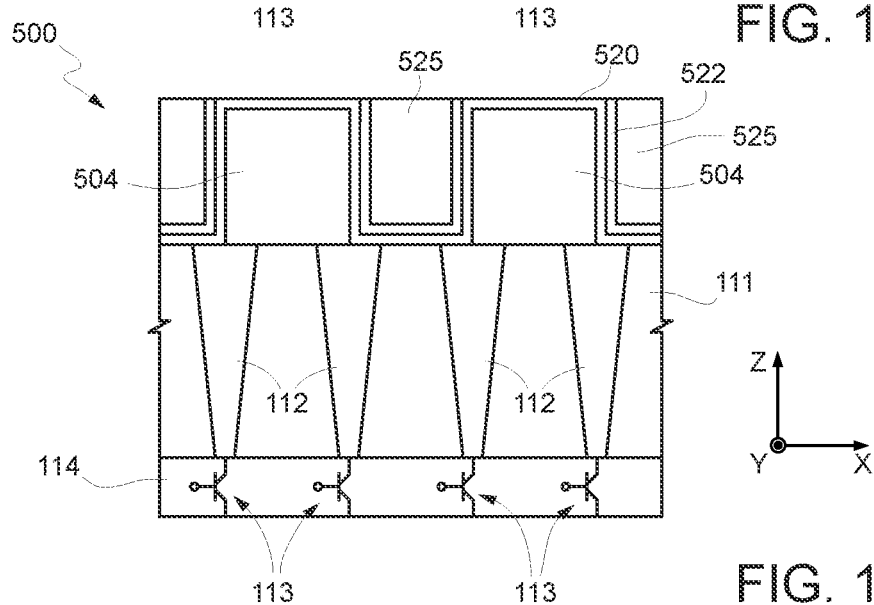

A step is then carried out, FIG. 12E, to remove selective portions of the filling layer 525 above the portions of the dielectric layer 504, exposing the resistive layer 520 resting on top of such portions of the dielectric layer 504. The filling layer 525 remains between such portions of the dielectric layer 504. This step can be carried out by means of a masked etching process (e.g., a lithographic process), or through a CMP step configured to land on the resistive layer 520 without damaging or excessively removing the resistive layer 520 on top of the portions of the dielectric layer 504.

Figure 12F:
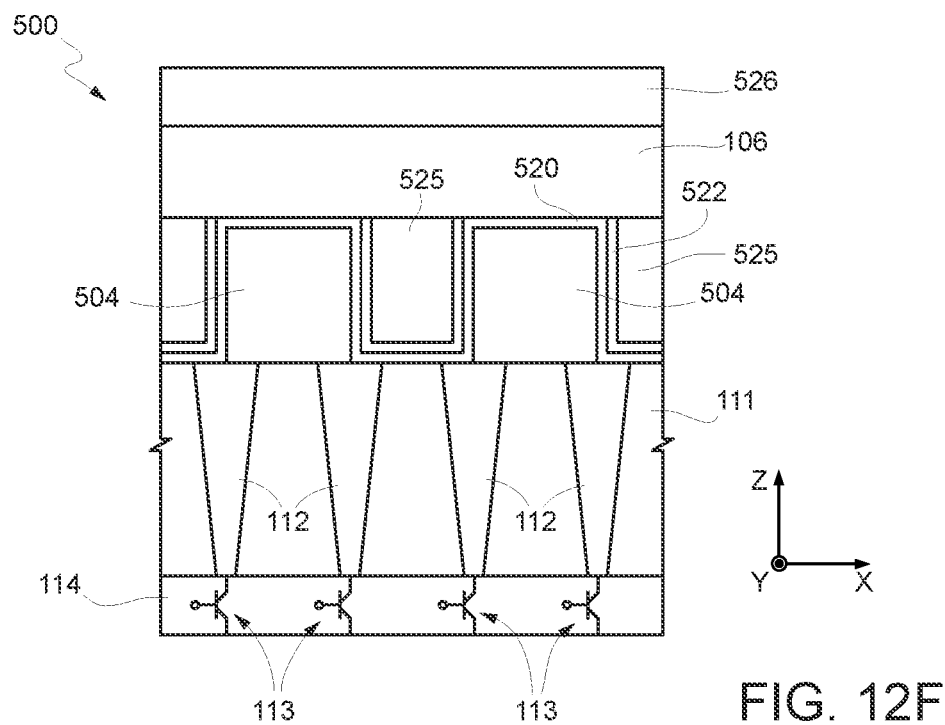

Then, FIG. 12F, steps of forming the memory regions are carried out. To this end, the crystalline layer 106 is deposited; the crystalline layer 106 is made of a phase-change material, in particular a chalcogenide material, such as GST alloy. A sealing layer 526, e.g., made of Silicon Nitride, is deposited on the crystalline layer 106 and is used as a mask for the subsequent step of FIG. 12G.

Figure 12G:
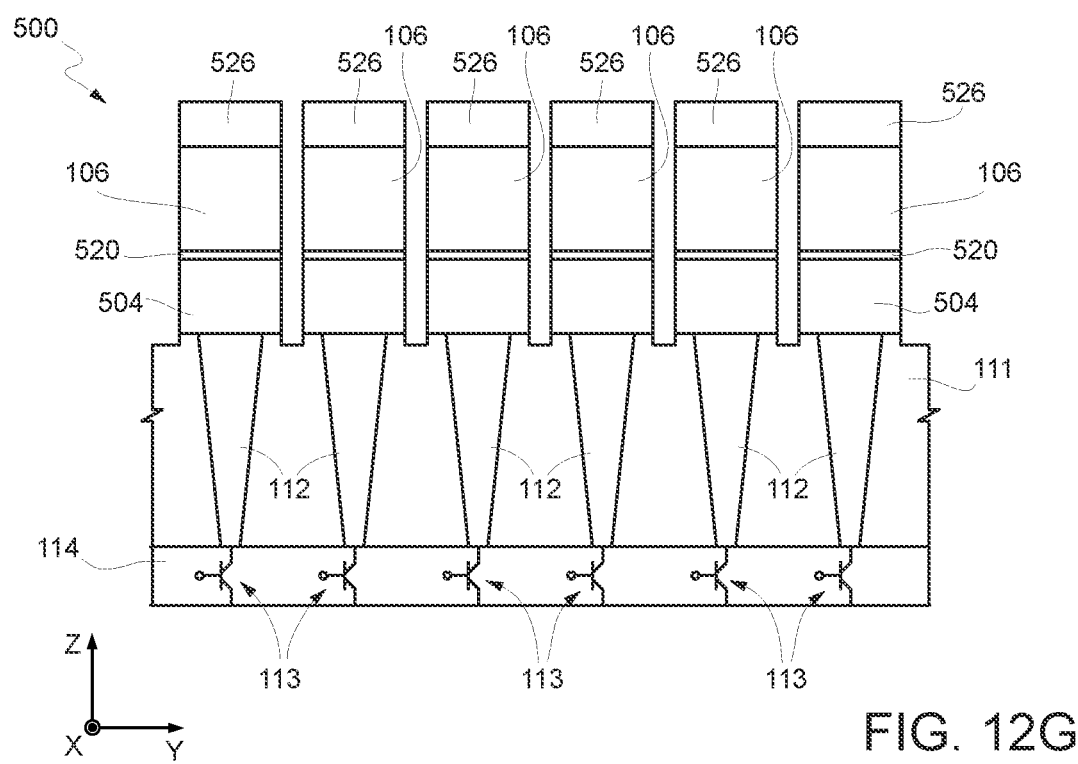

FIG. 12G shows the wafer 500 in a cross section taken along the Y axis, to better appreciate the etching step that is used to define grid-like or matrix pattern of the memory cells 100. With this step, the crystalline layer 106 and the underlying resistive and insulating layers 320, 504, are patterned along the Y axis, to form a plurality of memory regions (identified with the same reference numeral 106) physically separated from one another and coupled each one to a respective heater 102.

Figure 12H:
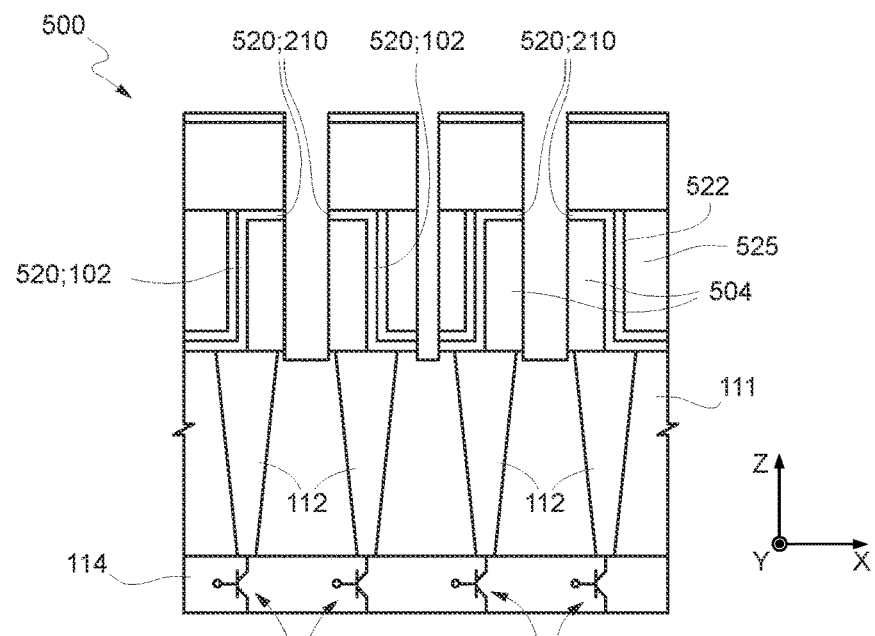

FIG. 12H shows the wafer 500 along the X axis, to appreciate that each memory region 106 is coupled to one respective heater 102 and to one respective resistive lamina 210, which departs from one side only of the heater 102 and is integral with the heater 102, leaving the other, opposite, side free from remains of the resistive layer 520 running along the X axis.

Layers 504, 522 and 525 will form, as a whole, the insulating layer 104 already mentioned.

The manufacturing of the memory device 10 can then be completed by forming the conductive metallic layer 108 on top of the crystalline layer 106, and filling the apertures with dielectric or insulating layer(s), thus completing the formation of the insulating layer 104. Proper electrical connection can then be formed. These steps are not, per se, part of the present invention and are therefore not further discussed.

Figure 13A:
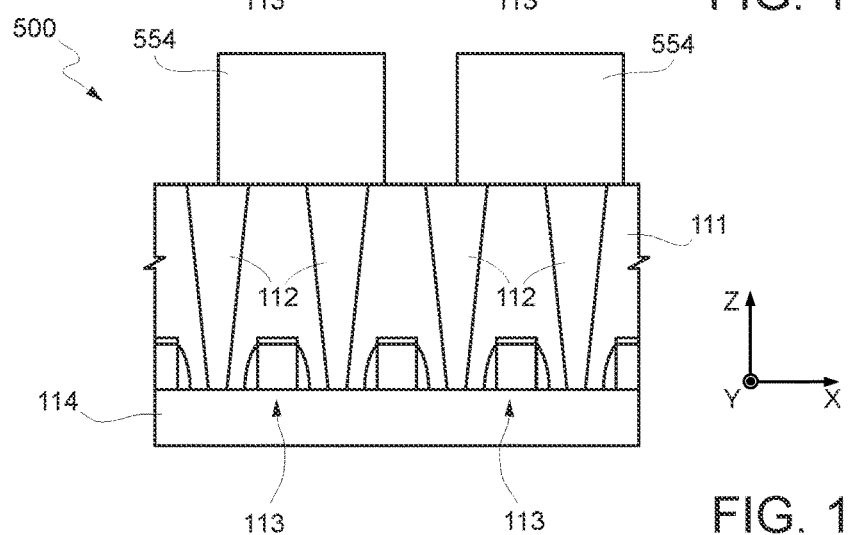
FIGS. 13A-13C show process steps carried out on a wafer for manufacturing a further phase-change memory device not shown in the previous figures.
Figure 13B:
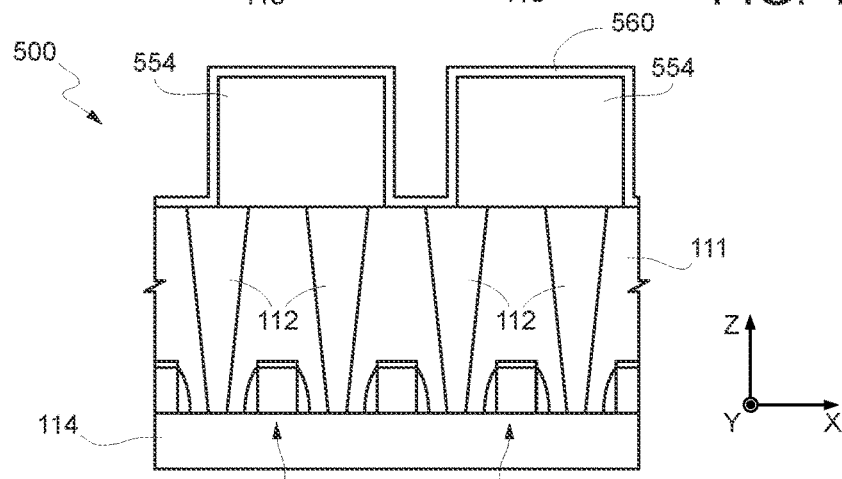
Figure 13C:
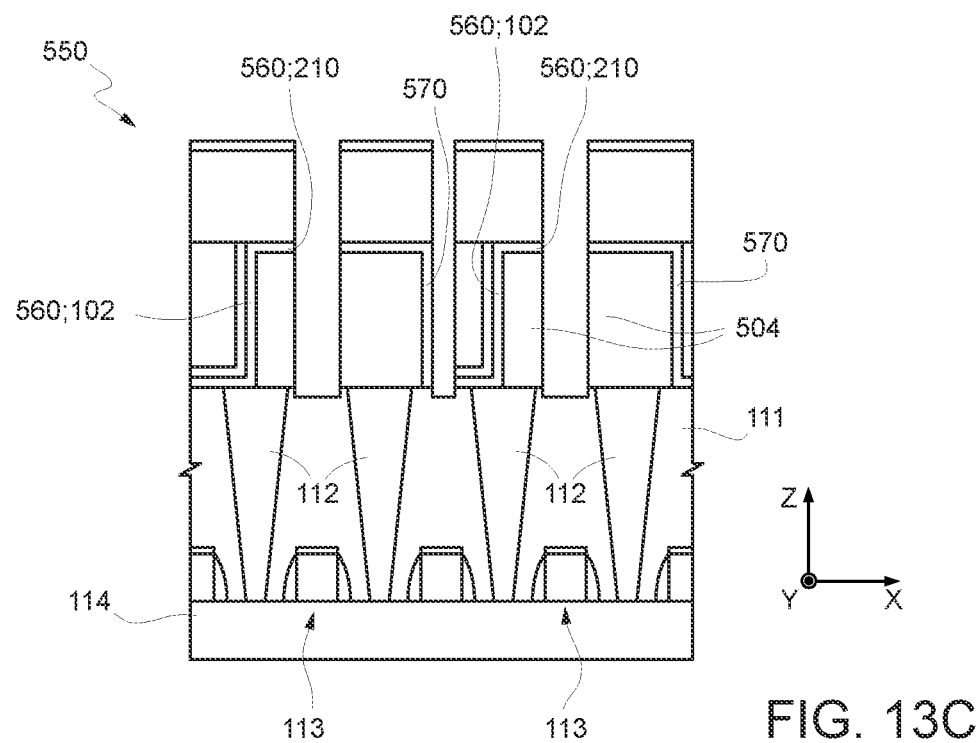

FIGS. 13A-13C show steps for manufacturing a memory device 10 where the resistive lamina 210 extends from the heater 102 as an integral part of the heater 102, but the selector devices 113 are MOSFET.

Only some manufacturing steps are shown and described, since the manufacturing process are analogous to that of FIGS. 12A-12H, already discussed. Like elements are identified with the same reference numerals.

With reference to FIG. 13A, a wafer 550 is provided, which has already been subject to manufacturing steps known in the art and therefore not further detailed. In particular, the wafer 550 includes the substrate 114, over which the insulating layer 111 extends. The insulating layer 111 is, for example, made of Silicon Oxide, or other insulating or dielectric material. Through the insulating layer 111, a plurality of the bottom contacts, or pillars, 112 (made of conductive material such as metal or doped polysilicon) extend. The bottom contacts 112 extend through the insulating layer 111 for the entire thickness of the insulating layer 111.

A step of depositing a further insulating or dielectric layer 554 on the insulating layer 111 is carried out; the insulating layer 554 is, in this embodiment, made of Silicon Nitride (SiN).

Then, the insulating layer 554 is patterned (e.g., by photolitographic and etching processes). The etching step removes selective portions of the insulating layer 554 until respective surface regions of the insulating layer 111 are exposed. In detail, the patterning is designed so that the remaining portions of the dielectric layer 554 extend in a strip-like fashion along the Y axis in top-plan view (on the XY plane) and are separated from one another along the X axis by the spaces left by the removed portions. Each one of the remaining portions of the dielectric layer 554 extends, along the X axis, from one pillar 112 (only partially covering the surface of such pillar 112) to another immediately subsequent pillar 112, fully covering the surface of such subsequent pillar 112.

A shown in FIG. 13B, a step of depositing a continuous layer of resistive material 560 is carried out. The layer of resistive material 560 covers the portions of the dielectric layer 554, the exposed surface of the pillars 112 and the exposed surface of the insulating layer 111 between the pillars 112.This layer of resistive material 560 will form, in subsequent steps, the plurality of heaters 102 as well as the resistive laminas 210. Therefore, the material of layer 560 as well as its thickness are chosen according to the needs and/or design requirements for the heaters 102 and of the resistive laminas 210. For example, the material is made of TiSiN and the thickness is in the range 350-400 nm.

Then, the manufacturing process continues analogously to what already described with reference to FIGS. 12D-12H.

After steps analogous to those described with reference to FIG. 12G, the embodiment of FIG. 13C is obtained, where dummy heaters 570 are present alternated, along X axis, to proper heaters 102 (the dummy heaters 510 are not working, since they are not electrically connected to pillars 112).

The manufacturing of the memory device 10 can then be completed by forming the conductive metallic layer 108 on top of the crystalline layer 106, and filling the apertures with dielectric or insulating layer(s). Proper electrical connection can then be formed. These steps are not, per se, part of the present invention and are therefore not further discussed.

Figure 14:
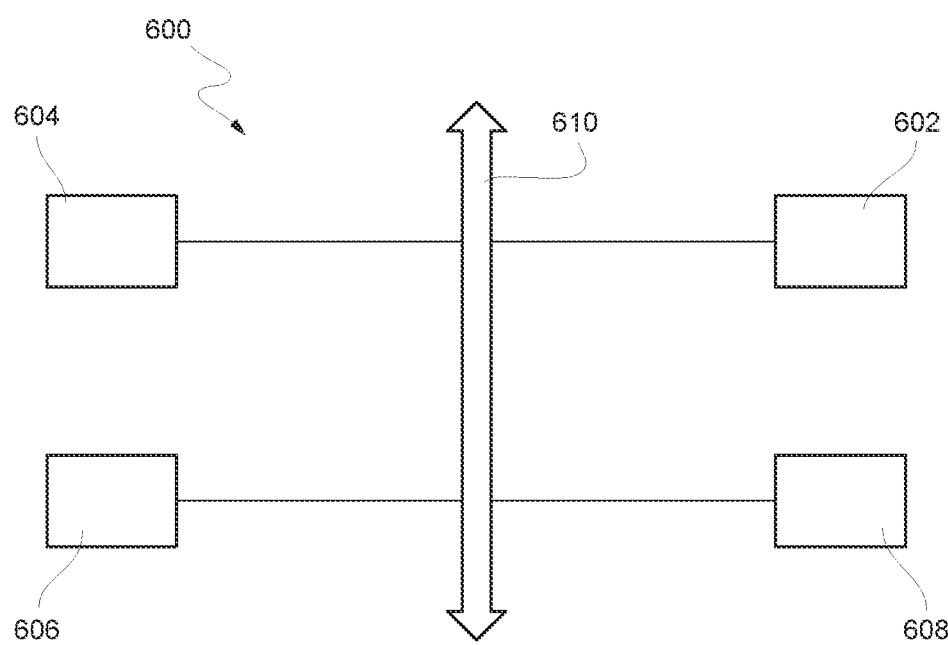
FIG. 14 schematically shows an embodiment of a memory.

FIG. 14 schematically shows an embodiment of a memory 600. The memory 600 comprises: one or a plurality of memory devices, such as devices comprising memory cells 100 previously described in relation to each of the embodiments disclosed, and shown in FIG. 14 by a block 602 (NVM); a data processing unit, represented by a block 604 (PU), for example, a microprocessor; one or a plurality of memory devices, represented by a block 606 (MEM), and which may be memory devices different from those of block 602; a block 608 (FCT) comprising other electronic functions, for example, sensors, load control circuits, etc.; and a data bus 610 enabling to transfer data between the different components.

The block 602 preferably includes a circuit for addressing the array of memory cells 100.

It is possible, for the memory devices of the block 506, not to be phase-change memory devices but to be RAMs, reprogrammable volatile memories (EEPROM, flash, etc.).

As an alternative, the block 606 may be omitted. The memory devices of the memory 600 are then only memory devices such as memory devices comprising memory cells 100. The memory is then entirely a non-volatile memory.

Various embodiments and variants have been described. Those skilled in the art will understand that certain features of these embodiments can be combined and other variants will readily occur to those skilled in the art.

Finally, the practical implementation of the embodiments and variants described herein is within the capabilities of those skilled in the art based on the functional description provided hereinabove.

The invention claimed is:

1. A phase-change memory cell, comprising:
a heater having a first lateral side and a second lateral side opposite to one another along a first axis, and a top side and a bottom side opposite to one another along a second axis orthogonal to the first axis; and
a memory region made of a phase-change material that is electrically and thermally coupled to the top side of the heater; and
an electrically conductive element, having a resistive characteristic, that extends parallel to the first axis away from the first lateral side;
wherein said electrically conductive element is positioned adjacent the first lateral side and in contact with said memory region;
wherein the electrically conductive element has, at said first lateral side and along the first axis, a first extension having a length that is equal to a corresponding first length of the memory region along the first axis at said first lateral side; and
wherein the electrically conductive element extends parallel to the first axis exclusively at said first lateral side and is absent at said second lateral side.

2. The phase-change memory cell according to claim 1, wherein the phase-change material of the memory region is configurable in a crystalline state and in an amorphous state, and wherein said resistive characteristic is such that the electrical resistivity of the electrically conductive element is between a resistivity of the crystalline state of the phase change material and a resistivity of the amorphous state of the phase change material.

3. The phase-change memory cell according to claim 1, wherein the electrically conductive element is made of a same material as the heater.

4. The phase-change memory cell according to claim 1, wherein the electrically conductive element is made of a different material from the heater.

5. The phase-change memory cell according to claim 1, wherein the electrically conductive element is integral with the heater and protrudes from the heater in electrical and physical continuity.

6. The phase-change memory cell according to claim 1, wherein said electrically conductive element is sandwiched between a first insulating region and said memory region;
wherein the first insulating region is physically separated from the memory region by the electrically conductive element; and
further comprising a second insulating region at the second side of the heater.

7. The phase-change memory cell according to claim 1, wherein the heater is centered with respect to said memory region.

8. The phase-change memory cell according to claim 1, wherein the heater is staggered or offset with respect to an axis of symmetry parallel to the second axis, of said memory region.

9. A memory device, comprising:
at least one phase-change memory cell as recited in claim 1.

10. A phase-change memory cell, comprising:
a heater having a first lateral side and a second lateral side opposite to one another along a first axis, and a top side and a bottom side opposite to one another along a second axis orthogonal to the first axis; and
a memory region made of a phase-change material that is electrically and thermally coupled to the top side of the heater; and
an electrically conductive element, having a resistive characteristic, that extends parallel to the first axis away from the first lateral side;
wherein said electrically conductive element is positioned adjacent the first lateral side and in contact with said memory region;
wherein the electrically conductive element has, at said first lateral side and along the first axis, a first extension having a length that is equal to a corresponding first length of the memory region along the first axis at said first lateral side; and
wherein the electrically conductive element further extends parallel to the first axis away from the second lateral side with a second extension having a length that is less than a corresponding second length of the memory region along the first axis at said second lateral side.

11. The phase-change memory cell according to claim 10, wherein the phase-change material of the memory region is configurable in a crystalline state and in an amorphous state, and wherein said resistive characteristic is such that the electrical resistivity of the electrically conductive element is between a resistivity of the crystalline state of the phase change material and a resistivity of the amorphous state of the phase change material.

12. The phase-change memory cell according to claim 10, wherein the electrically conductive element is made of a same material as the heater.

13. The phase-change memory cell according to claim 10, wherein the electrically conductive element is made of a different material from the heater.

14. The phase-change memory cell according to claim 10, wherein the electrically conductive element is integral with the heater and protrudes from the heater in electrical and physical continuity.

15. The phase-change memory cell according to claim 10, wherein said electrically conductive element is sandwiched between a first insulating region and said memory region;
wherein the first insulating region is physically separated from the memory region by the electrically conductive element; and
further comprising a second insulating region at the second side of the heater, the second insulating region being at least in part in direct contact with said memory region.

16. The phase-change memory cell according to claim 10, wherein the heater is centered with respect to said memory region.

17. The phase-change memory cell according to claim 10, wherein the heater is staggered or offset with respect to an axis of symmetry parallel to the second axis, of said memory region.

18. A memory device, comprising at least one phase-change memory cell as recited in claim 10.

19. A method for manufacturing a phase-change memory cell, comprising:
forming a heater having a first lateral side and a second lateral side opposite to one another along a first axis, and a top side and a bottom side opposite to one another along a second axis orthogonal to the first axis; and
forming a memory region made of a phase-change material that is electrically and thermally coupled to the top side of the heater; and
forming an electrically conductive element, having a resistive characteristic, that extends parallel to the first axis at the first lateral side, adjacent to the first lateral side of said heater and to said memory region;
wherein forming the electrically conductive element includes forming the electrically conductive element to have, at said first lateral side and along the first axis, a first extension that is equal to a corresponding first length of the memory region along the first axis at said first lateral side; and
wherein the electrically conductive element is not formed at said second lateral side.

20. The method according to claim 19, wherein the phase-change material of the memory region is configurable in a crystalline state and in an amorphous state, and wherein said resistive characteristic is such that the electrical resistivity of the electrically conductive element is between a resistivity of the crystalline state of the phase change material and a resistivity of the amorphous state of the phase change material.

21. The method according to claim 19, wherein the electrically conductive element is formed integral with the heater and protrudes from the heater in electrical and physical continuity.

22. The method according to claim 19, further comprising sandwiching said electrically conductive element between a first insulating region and said memory region;
wherein the electrically conductive element is formed above the first insulating region such as to physically separate the first insulating region from the memory region; and
further comprising forming a second insulating region at the second side of the heater.

23. The method according to claim 19, wherein the heater is formed centered with respect to said memory region.

24. The method according to claim 19, wherein the heater is formed staggered or offset with respect to an axis of symmetry, parallel to the second axis, of said memory region.

* * * * *